(12) United States Patent
Araki et al.

(10) Patent No.: US 6,737,164 B2
(45) Date of Patent: *May 18, 2004

(54) COMPOSITE MATERIALS FOR COOKWARE

(75) Inventors: Takayuki Araki, Settsu (JP); Yoshito Tanaka, Settsu (JP); Masahiro Kumegawa, Settsu (JP); Noritoshi Oka, Settsu (JP); Hisato Sanemasa, Settsu (JP); Tetsuo Shimizu, Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/380,499

(22) PCT Filed: Mar. 5, 1998

(86) PCT No.: PCT/JP98/00901
§ 371 (c)(1),
(2), (4) Date: Sep. 3, 1999

(87) PCT Pub. No.: WO98/38897
PCT Pub. Date: Sep. 11, 1998

(65) Prior Publication Data
US 2003/0049454 A1 Mar. 13, 2003

(30) Foreign Application Priority Data
Mar. 7, 1997 (JP) .............................. 9/053659

(51) Int. Cl.⁷ ......................... B32B 27/08; B32B 27/30
(52) U.S. Cl. ....................... 428/421; 428/422
(58) Field of Search ............... 428/35.7, 35.8, 428/421, 422; 99/324; 126/1 R, 4, 373

(56) References Cited

U.S. PATENT DOCUMENTS

| | | | | |
|---|---|---|---|---|
| 3,799,996 A | * | 3/1974 | Bloch | 502/174 |
| 5,059,720 A | * | 10/1991 | Hung | 568/674 |
| 5,304,617 A | * | 4/1994 | Kodama et al. | 526/249 |
| 5,374,683 A | | 12/1994 | Morgan | 525/200 |
| 5,670,593 A | * | 9/1997 | Araki et al. | 526/245 |
| 5,750,626 A | | 5/1998 | Shimizu et al. | 525/151 |
| 5,869,574 A | | 2/1999 | Shimizu et al. | 525/151 |
| 5,986,150 A | | 11/1999 | Araki et al. | 526/245 |
| 6,054,537 A | | 4/2000 | Shimizu et al. | 525/189 |
| 6,069,215 A | | 5/2000 | Araki et al. | 526/245 |
| 6,225,399 B1 | | 5/2001 | Araki et al. | 568/843 |

FOREIGN PATENT DOCUMENTS

| | | |
|---|---|---|
| EP | 0 135 917 A1 | 4/1985 |
| EP | 0 728 776 A1 | 8/1996 |
| JP | 57-137365 | 8/1982 |
| JP | 3-17109 | 1/1991 |
| JP | 4-242620 | 8/1992 |
| JP | 5-1118 | 1/1993 |
| JP | 6-106693 | * 4/1994 |
| JP | 8-215055 | 8/1996 |
| JP | 8-299191 | 11/1996 |
| JP | 8-322732 | 12/1996 |
| JP | 9-157578 | 6/1997 |

OTHER PUBLICATIONS

Derwent abstract of Japanese Patent 6–106693.*
English translation of JP6–106693–A, Apr. 1994.*
English Translation of International Preliminary Examination Report for PCT/JP98/00901.

* cited by examiner

Primary Examiner—Ramsey Zacharia
(74) Attorney, Agent, or Firm—Sughrue Mion, PLLC

(57) ABSTRACT

Composite materials for cooking apparatuses which are produced by applying, to a substrate, a material comprising a fluorine-containing polymer having an excellent adhesive property to the substrate without necessitating complicated steps and are excellent in heat resistance, non-sticking property, stain-proofing property, water- and oil-repelling property, stain-removing property, chemical resistance, rust-preventing property, antibacterial property, resistance to energy ray and abrasion resistance. The composite materials for cooking apparatuses are produced by applying, to the substrate, the material comprising a fluorine-containing ethylenic polymer having functional group which is prepared by copolymerizing (a) 0.05 to 30% by mole of at least one of fluorine-containing ethylenic monomers having at least one functional group selected from the group consisting of hydroxyl, carboxyl, a carboxylic salt group, a carboxylic ester group and epoxy, and (b) 70 to 99.95% by mole of at least one of fluorine-containing ethylenic monomers having no functional group mentioned above.

1 Claim, 14 Drawing Sheets

COMPOSITE MATERIALS FOR COOKWARE

The present invention relates to composite materials for cooking apparatuses which are produced by applying, to a substrate, a fluorine-containing polymer excellent in heat resistance, non-sticking property, transparency (property for exhibiting clear surface pattern), stain-proofing property and water- and oil-repelling property and particularly in adhesive property to the substrate.

PRIOR ART

With respect to cooking apparatuses represented by a griddle and a rice cooker, it is desired that cooking can be done at higher temperature for shortening of cooking time and to pursue good taste of cooked dishes. Also it is desired that stains such as oil and scorch can be easily removed so as to make cleaning of these apparatuses easy after the cooking. Further good property for exhibiting clear surface pattern is also desired from the viewpoint of appearance thereof.

In order to meet such requirements, for the composite materials used for cooking apparatuses (cooking appliances, wares, utensils, tools, etc.), a fluorine-containing resin which is excellent in heat resistance, chemical resistance, weather resistance, surface properties (friction resistance, etc.), electric insulating property and the like is used in the form of coating or film.

However the fluorine-containing resin involves a substantial problem, namely insufficient adhesion to a metal or glass substrate due to its excellent non-sticking property.

Therefore in case where the fluorine-containing resin is used in the form of coating, there is a method of adhering a fluorine-containing resin to a substrate by roughening the surface of metal chemically or physically with expecting anchor effect between them. However this method requires much labor in the surface roughening itself, and though initial adhesion is possible, lowering of the anchor effect arises when a temperature change is made repeatedly and in case of use at high temperature.

Also a method for chemically activating a surface of a fluorine-containing resin by treating the surface with a solution prepared by dissolving metallic sodium in liquid ammonia has been proposed. However in that method, not only there is a fear that the solution itself causes environmental pollution but also there is a problem that its handling is attended with danger.

Further though a method for carrying out physical and chemical treatment such as plasma sputtering on a surface of a fluorine-containing resin has been proposed, there is a problem that much labor is required for the treatment and an increase in cost is resulted.

Also in order to improve adhesion of a fluorine-containing resin coating composition, investigations with respect to addition of various components and use of a primer have been made.

For example, there is a technique of adding an inorganic acid such as chromic acid to a coating composition containing a fluorine-containing resin to form chemical conversion coating film on a surface of metal for enhancing adhesion of the composition (JP-B-63-2675). However since chromic acid contains hexahydric chromium, it cannot be said that such a technique is sufficient in view of safety in food and coating work. Further in case of use of other inorganic acids such as phosphoric acid, there was a problem that safety of a fluorine-containing resin coating composition is damaged.

Use of a coating composition containing a fluorine-containing resin as a primer, in which heat resistant resins such as polyamideimide, polyimide, polyethersulfone and polyether ether ketone and in addition, a metal powder are added instead of the above-mentioned inorganic acid, has been studied (JP-A-6-264000). Inherently there is almost no compatibility between a fluorine-containing resin and a heat resistant resin. Therefore there arises a phase separation in a coating film, thus easily causing intercoat adhesion failure between the primer and the top coat of the fluorine-containing resin. Further film defects such as pin holes and cracks arise easily at the time of processing at high temperature or during use due to a difference in heat shrinkage between the fluorine-containing resin and the heat resistant resin or due to lowering of elongation of the coating film by the addition of the heat resistant resin. Also since those heat resistant resins are colored brown by baking, property for exhibiting clear surface pattern is poor and it is difficult to use them for applications requiring white and vivid colors and transparency. Further when the heat resistant resin is blended, non-sticking property and friction resistance which the fluorine-containing resin possesses inherently are lowered.

Also for adhesion of a fluorine-containing resin coating composition to glass, etc. requiring transparency, an improvement of the adhesion has been tried by treating the substrate with a silane coupling agent or adding a silicone resin to the fluorine-containing resin coating composition (JP-B-54-42366, JP-A-5-177768). However enhancement of adhesion is insufficient, heat resistance is lowered and separation of film, foaming and coloring arise easily at sintering or in use at high temperature.

On the contrary, fluorine-containing resin coating compositions prepared by copolymerizing a hydrocarbon monomer (containing no fluorine) containing functional group such as hydroxyl or carboxyl have been discussed. However those coating compositions were originally studied mainly for a purpose of weather resistance, and it is difficult to use them for application requiring heat resistance at 200° to 350° C. which is directed by the present invention, and for applications requiring non-sticking property, friction resistance, etc.

Namely with respect to a polymer prepared by copolymerizing a hydrocarbon monomer (containing no fluorine) having functional group, thermal decomposition easily occurs on components of the monomer at the time of processing at high temperature or during use, and thus coating film failure, coloring, foaming, separation, etc. arise, which makes it impossible to attain purposes of coating a fluorine-containing resin.

Further fluorine-containing resins are generally insufficient in mechanical strength and dimensional stability, and high in price. In order to make the best use of the above-mentioned merits of the fluorine-containing polymer and minimize its disadvantages, investigations have been made also with respect to its use in the form of film.

However the fluorine-containing resin inherently has low adhesive force, and it is difficult to adhere the fluorine-containing resin directly to other material (substrate). For example, even if the adhering is tried by thermo-processing, adhesive strength of the fluorine-containing resin is not enough, or even if the resin has adhesive force to a certain extent, such an adhesive force is apt to vary depending on kind of the substrate. Thus in many cases, reliability on the adhesive strength of the fluorine-containing resin has been not so enough.

In order to adhere the fluorine-containing resin film to a substrate, mainly the following methods have been studied:

1. a method for physically roughening a surface of substrate by sand blasting, etc.,
2. a method for surface-treating a fluorine-containing resin film by chemical treatment such as sodium etching, plasma treatment, photochemical treatment, etc.,
3. a method for adhering by using an adhesive, and other methods. With respect to the methods 1 and 2 above, surface-treating steps are required, and the steps are complicated and productivity is poor. Also kinds and shapes of substrates are restricted. The fluorine-containing resin film inherently has low adhesive force, and there easily occur problems with appearance such as coloring and color (property for exhibiting clear surface pattern) of the obtained composite material. Also the method of using a chemical such as sodium etching has a problem with safety.

Use of an adhesive in the method 3 above has also been discussed. A usual hydrocarbon type (non-fluorine-containing) adhesive does not have enough adhesive property and its heat resistance is insufficient. Thus a hydrocarbon type adhesive cannot stand under conditions for adhering of a fluorine-containing polymer film, which requires molding and processing at high temperature, and peeling due to decomposition of the adhesive and coloring occur. The above-mentioned laminated article produced by using an adhesive also lacks in reliability with respect to its adhesive property, since an adhesive layer is insufficient in heat resistance, chemical resistance and water resistance and its adhesive force cannot be maintained due to a change in temperature and environment.

On the contrary, adhesion by using an adhesive and adhesive composition comprising a fluorine-containing polymer having functional group is discussed.

For example, it is reported that a fluorine-containing polymer prepared by graft-polymerizing, to the fluorine-containing polymer, a hydrocarbon monomer which has carboxyl represented by maleic anhydride and vinyltrimethoxysilane, a residual group of carbonic acid, epoxy or a hydrolyzable silyl group, is used as an adhesive (for example, JP-A-7-18035, JP-A-7-25952, JP-A-7-25954, JP-A-7-173230, JP-A-7-173446, JP-A-7-173447) and that an adhesive composition comprising a fluorine-containing copolymer prepared by copolymerizing a hydrocarbon monomer having functional group such as hydroxyalkyl vinyl ether with tetrafluoroethylene or chlorotrifluoroethylene and an isocyanate hardening agent is cured and used as an adhesive between vinyl chloride and corona-discharged ETFE (for example, JP-A-7-228848).

The above-mentioned adhesive or adhesive composition comprising a fluorine-containing resin prepared by graft-polymerizing or copolymerizing a hydrocarbon monomer having functional group does not have enough heat resistance, and thus at the time of processing a composite material comprising the adhesive or adhesive composition and a fluorine-containing resin film at high temperature or during use at high temperature, decomposition and foaming occur, thereby causing reduction of adhesive strength, peeling and coloring. In case of the adhesive composition disclosed in JP-A-7-228848, it is necessary to corona-discharge the fluorine-containing resin film.

As mentioned above, there have been no material for composite materials for cooking apparatuses which meets the above-mentioned requirements and assures strong adhesion to a substrate and excellent property for exhibiting clear surface pattern.

In view of the above-mentioned facts, an object of the present invention is to provide composite materials for cooking apparatuses which are produced by applying, to a substrate, a material comprising a fluorine-containing polymer being excellent in adhesion to the substrate without necessitating complicated steps.

Further an object of the present invention is to provide composite materials for cooking apparatuses which are excellent in non-sticking property, stain-proofing property, water- and oil-repelling property, stain removing property, chemical resistance, rust preventing property, antibacterial property, resistance to energy ray and friction resistance.

DISCLOSURE OF THE INVENTION

The present invention relates to composite materials for cooking apparatuses which are produced by applying, to a substrate, a material comprising a fluorine-containing ethylenic polymer having functional group and prepared by copolymerizing:

(a) 0.05 to 30% by mole of at least one of fluorine-containing ethylenic monomers having at least one functional group selected from the group consisting of hydroxyl, carboxyl, a carboxylic salt group, a carboxylic ester group and epoxy and
(b) 70 to 99.95% by mole of at least one of fluorine-containing ethylenic monomers having no functional group mentioned above.

In that case, it is preferable that the above-mentioned fluorine-containing ethylenic monomer (a) having functional group is at least one of fluorine-containing ethylenic monomers represented by the formula (1):

$$CX_2=CX^1-R_f-Y \tag{1}$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Further it is preferable that the above-mentioned fluorine-containing ethylenic monomer (b) having no functional group is tetrafluoroethylene.

Further it is preferable that the above-mentioned fluorine-containing ethylenic monomer (b) having no functional group is a monomer mixture of 85 to 99.7% by mole of tetrafluoroethylene and 0.3 to 15% by mole of a monomer represented by the formula (2):

$$CF_2=CF-R_f^1 \tag{2}$$

wherein R$_f^1$ is CF$_3$ or OR$_f^2$, in which R$_f^2$ is a perfluoroalkyl group having 1 to 5 carbon atoms.

Further it is preferable that the above-mentioned fluorine-containing ethylenic monomer (b) having no functional group is a monomer mixture comprising 40 to 80% by mole of tetrafluoroethylene, 20 to 60% by mole of ethylene and 0 to 15% by mole of other monomer copolymerizable with those monomers.

Also the present invention relates to the composite materials for cooking apparatuses, which are produced by applying, to a substrate, the above-mentioned fluorine-containing ethylenic polymer having functional group in the form of coating.

Also the present invention relates to the composite materials for cooking apparatuses, which are produced by applying, to a substrate, the above-mentioned fluorine-containing ethylenic polymer having functional group in the form of an aqueous dispersion.

Also the present invention relates to the composite materials for cooking apparatuses, which are produced by applying, to a substrate, the above-mentioned fluorine-containing ethylenic polymer having functional group in the form of a powder coating composition.

Also the present invention relates to the composite materials for cooking apparatuses, which are produced by applying, to a substrate, the above-mentioned fluorine-containing ethylenic polymer having functional group in the form of a film.

It is preferable that the above-mentioned substrate is a metallic substrate.

Also it is preferable that the above-mentioned substrate is a glass substrate.

The present invention relates to cooking apparatuses produced by using the composite materials for cooking apparatuses.

Also the present invention relates to heating apparatuses for cooking produced by using the composite materials for cooking apparatuses.

Also the present invention relates to a griddle produced by using the composite materials for cooking apparatuses.

Also the present invention relates to a griddle produced by using the composite materials for cooking apparatuses on its heating surface made of metal.

Also the present invention relates to a griddle produced by using the composite materials for cooking apparatuses on its glass lid.

Also the present invention relates to a range with oven produced by using the composite materials for cooking apparatuses.

Also the present invention relates to a range with oven produced by using the composite materials for cooking apparatuses on its inner surface made of metal.

Also the present invention relates to a range with oven produced by using the composite materials for cooking apparatuses on its cooking plate.

Also the present invention relates to a range with oven produced by using the composite materials for cooking apparatuses on its glass door.

Also the present invention relates to a heating pot produced by using the composite materials for cooking apparatuses.

Also the present invention relates to a heating pot produced by using the composite materials for cooking apparatuses on its heating surface made of metal.

Also the present invention relates to a heating pot produced by using the composite materials for cooking apparatuses on its glass lid.

Also the present invention relates to a frying pan produced by using the composite materials for cooking apparatuses.

Also the present invention relates to a frying pan produced by using the composite materials for cooking apparatuses on its heating surface made of metal.

Also the present invention relates to a fryer produced by using the composite materials for cooking apparatuses.

Also the present invention relates to a fryer produced by using the composite materials for cooking apparatuses on its inner surface made of metal.

Also the present invention relates to a fryer produced by using the composite materials for cooking apparatuses on its inner surface made of glass.

Also the present invention relates to a rice cooker produced by using the composite materials for cooking apparatuses.

Also the present invention relates to a rice cooker produced by using the composite materials for cooking apparatuses on its inner surface made of metal.

Also the present invention relates to a rice cooker produced by using the composite materials for cooking apparatuses on its inner lid made of metal.

Also the present invention relates to a pot produced by using the composite materials for cooking apparatuses.

Also the present invention relates to a pot produced by using the composite materials for cooking apparatuses on its inner surface made of metal.

Also the present invention relates to a pot produced by using the composite materials for cooking apparatuses on its inner lid made of metal.

Also the present invention relates to a tableware or vessel produced by using the composite materials for cooking apparatuses.

Also the present invention relates to a metallic tableware or vessel produced by using the composite materials for cooking apparatuses.

Also the present invention relates to a glass tableware or vessel produced by using the composite materials for cooking apparatuses.

Also the present invention relates to cooking apparatuses for processing foods which are produced by using the composite materials for cooking apparatuses.

Also the present invention relates to cooking apparatuses for mixing foods which are produced by using the composite materials for cooking apparatuses.

Also the present invention relates to cooking apparatuses for cutting foods which are produced by using the composite materials for cooking apparatuses.

Also the present invention relates to baking apparatuses produced by using the composite materials for cooking apparatuses.

BEST MODE FOR CARRYING OUT THE INVENTION

Figure 1:
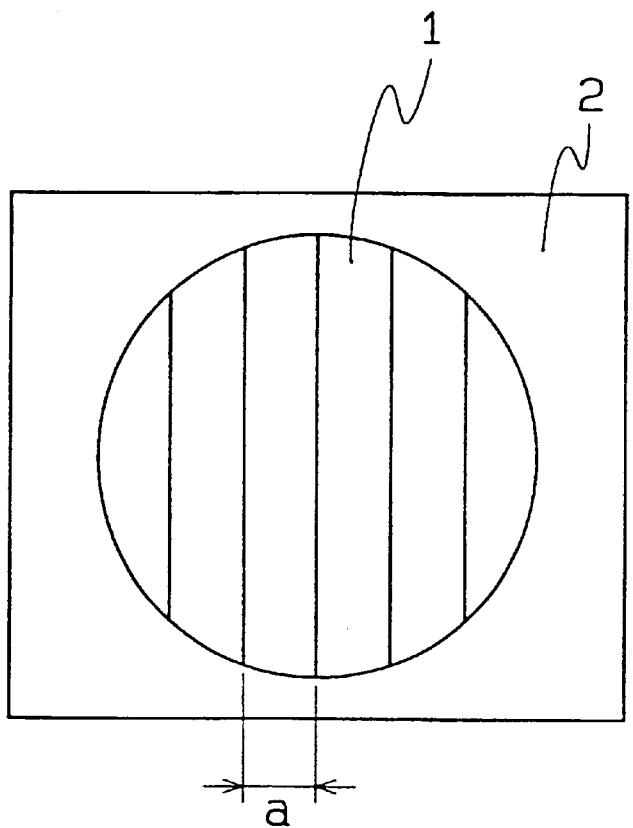
FIG. 1 is a diagrammatic plan view of an adhered sample made to measure adhesive strength in Example 7 of the present invention.

The composite material for cooking apparatuses of the present invention is one produced by applying, to a substrate, a material comprising a fluorine-containing ethylenic polymer having functional group and prepared by copolymerizing:

(a) 0.05 to 30% by mole of at least one of fluorine-containing ethylenic monomers having at least one functional group selected from the group consisting of hydroxyl, carboxyl, a carboxylic salt group, a carboxylic ester group and epoxy and (b) 70 to 99.95% by mole of at least one of fluorine-containing ethylenic monomers having no functional group mentioned above.

The above-mentioned material comprising a fluorine-containing ethylenic polymer having functional group has surprisingly strong adhesive property in the form of coating or film to metal, glass and other substrates even without use of an adhesive, surface-treatment on the substrate, formation of a primer layer and addition of a component having adhesive property in the material.

With respect to the fluorine-containing ethylenic polymer having functional group which is used for preparing the composite material of the present invention, it is important to copolymerize (a) the above-mentioned fluorine-containing ethylenic monomer having functional group and (b) the fluorine-containing ethylenic monomers having no functional group mentioned above to introduce the functional group into the fluorine-containing polymer, thereby making it possible to give excellent adhesive force directly to surfaces of various substrates, to which adhesion has been difficult or impossible. Namely as compared with a fluorine-containing polymer prepared by copolymerizing a non-fluorine-containing monomer having functional group, the fluorine-containing polymer of the present invention is excellent in heat resistance, and decomposition at processing at high temperature (for example, 200° to 400° C.) can be inhibited more and a large adhesive strength can be obtained. Further a coating layer being free from coloring, foaming, pin hole caused thereby and leveling failure can be formed on a substrate. Also in case where the composite material is used at high temperature, adhesive property is maintained and a coating layer failure such as coloring, whitening, foaming or pin hole is difficult to arise.

The above-mentioned fluorine-containing polymer having functional group has excellent characteristics such as not only heat resistance thereof but also chemical resistance, non-sticking property, stain-proofing property, friction resistance and weather resistance of a fluorine-containing polymer and can give such excellent characteristics to a composite material without lowering them.

Then the fluorine-containing ethylenic copolymer having functional group which is a material for the composite material of the present invention is explained below.

The functional group of the fluorine-containing ethylenic polymer having functional group is at least one functional group selected from the group consisting of hydroxyl, carboxyl, a carboxylic salt group, a carboxylic ester group and epoxy, and provides the polymer with adhesion to various substrates by its effect. Kinds and combination of the functional groups are optionally selected depending on kind of a surface of the substrate and purpose and application. From the viewpoint of heat resistance, hydroxyl is most preferable.

Examples of the preferred fluorine-containing ethylenic monomer (a) having functional group which is one of components constituting the fluorine-containing ethylenic polymer having functional group are fluorine-containing ethylenic monomers (a-1) having functional group which are represented by the formula (1):

$$CX_2=CX^1-R_f-Y \qquad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Examples of the fluorine-containing ethylenic monomer (a-1) having functional group are one represented by the formula (3):

$$CF_2=CF-R_f-Y \qquad (3)$$

wherein Y is as defined in the above formula (1), $R_f^3$ is a divalent fluorine-containing alkylene group having 1 to 40 carbon atoms or OR$_f^4$, in which R$_f^4$ is a divalent fluorine-containing alkylene group having 1 to 40 carbon atoms or a divalent fluorine-containing alkylene group having ether bond and 1 to 40 carbon atoms, one represented by the formula (4):

$$CF_2=CFCF_2-OR_f^5-Y \qquad (4)$$

wherein Y is as defined in the above formula (1), $R_f^5$ is a divalent fluorine-containing alkylene group having 1 to 39 carbon atoms or a divalent fluorine-containing alkylene group having ether bond and 1 to 39 carbon atoms, one represented by the formula (5):

$$CH_2=CFCF_2-R_f^6-Y \quad (5)$$

wherein Y is as defined in the above formula (1), $R_f^6$ is a divalent fluorine-containing alkylene group having 1 to 39 carbon atoms or $OR_f^7$, in which $R_f^7$ is divalent fluorine-containing alkylene group having 1 to 39 carbon atoms or a divalent fluorine-containing alkylene group having ether bond and 1 to 39 carbon atoms, one represented by the formula (6):

$$CH_2=CH-R_f^8-Y \quad (6)$$

wherein Y is as defined in the above formula (1), $R_f^8$ is a divalent fluorine-containing alkylene group having 1 to 40 carbon atoms, or the like monomer.

From the viewpoint that copolymerizability with the fluorine-containing ethylenic monomer (b) having no functional group is comparatively good and that heat resistance of the obtained polymer is not lowered remarkably, the fluorine-containing ethylenic monomers having functional group and represented by the formulae (3) to (6) are preferable.

Among them, from the viewpoint of copolymerizability with the fluorine-containing ethylenic monomer (b) having no functional group and heat resistance of the obtained polymer, the compounds of the formulae (3) and (5) are preferable, and the compound of the formula (5) is particularly preferable.

Examples of the fluorine-containing ethylenic monomer having functional group and represented by the formula (3) are:

$$CF_2=CFOCF_2CF_2CH_2OH, \quad CF_2=CFO(CF_2)_3COOH,$$

$$CF_2=CFOCF_2CF_2COOCH_3,$$

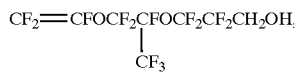

$$CF_2=CFCF_2COOH, \quad CF_2=CFCF_2CH_2OH,$$

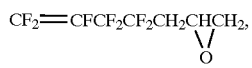

and the like.

Examples of the fluorine-containing ethylenic monomer having functional group and represented by the formula (4) are:

$$CF_2=CFCF_2OCF_2CF_2CF_2COOH,$$

and the like.

Examples of the fluorine-containing ethylenic monomer having functional group and represented by the formula (5) are:

$$CH_2=CFCF_2CF_2CH_2CH_2OH, \quad CH_2=CFCF_2CF_2COOH,$$

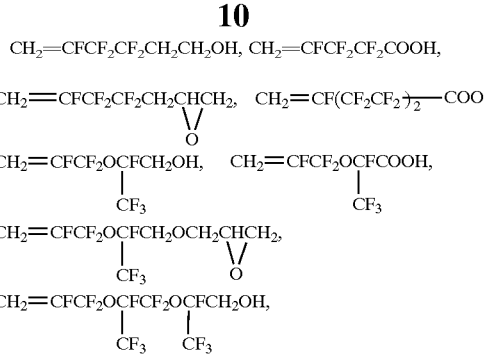

and the like.

Examples of the fluorine-containing ethylenic monomer having functional group and represented by the formula (6) are:

$$CH_2=CHCF_2CF_2CH_2CH_2COOH,$$

$$CH_2=CH\text{-}(CF_2)_4CH_2CH_2CH_2OH,$$

$$CH_2=CH\text{-}(CF_2)_6CH_2CH_2COOCH_3,$$

and the like.

In addition, there are:

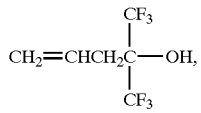

and the like.

The fluorine-containing ethylenic monomer (b) having no functional group which is copolymerized with the fluorine-containing ethylenic monomer (a) having functional group can be optionally selected from known monomers, and gives heat resistance, chemical resistance, non-sticking property, stain-proofing property and friction resistance to the polymer.

Examples of the fluorine-containing ethylenic monomer (b) are tetrafluoroethylene, a monomer represented by the formula (2): $CF_2=CF-R_f^1$, wherein $R_f^1$ is $CF_3$ or $OR_f^2$, in which $R_f^2$ is a perfluoroalkyl group having 1 to 5 carbon atoms, chlorotrifluoroethylene, vinylidene fluoride, vinyl fluoride, hexafluoroisobutene, $$CH_2=CF\text{-}(CF_2)_nX^2, \quad CH_2=CH\text{-}(CF_2)_nX^2,$$

wherein $X^2$ are selected from hydrogen atom, chlorine atom and fluorine atom, n are an integer of 1 to 5, and the like.

In addition to the fluorine-containing ethylenic monomer (a) having functional group and the fluorine-containing ethylenic monomer (b) having no functional group, an ethylenic monomer having no fluorine atom may be copolymerized in the range of not lowering heat resistance and non-sticking property. In that case, it is preferable that the ethylenic monomer having no fluorine atom is selected from ethylenic monomers having not more than 5 carbon atoms in order not to lower heat resistance. Examples of such an ethylenic monomer are ethylene, propylene, 1-butene, 2-butene, and the like.

A content of the fluorine-containing ethylenic monomer (a) having functional group in the fluorine-containing ethylenic polymer having functional group which is used in the present invention is from 0.05 to 30% by mole on the basis of the whole monomers in the polymer. Further the content is optionally selected depending on kinds of the surface of a substrate for cooking apparatuses, shape of the substrate, coating method, film forming method and conditions and further depending on purposes and applications. The content of the fluorine-containing ethylenic monomer (a) having functional group is preferably from 0.05 to 20% by mole, particularly preferably from 0.1 to 10% by mole.

When the content of the fluorine-containing ethylenic monomer having functional group is less than 0.05% by mole, sufficient adhesion to the substrate surface is difficult to obtain, and separation easily occurs due to temperature change and penetration of chemicals. When more than 30% by mole, heat resistance is lowered, there occur adhesion failure, coloring, foaming and pin hole at sintering at high temperature or during use at high temperature, thus easily lowering property for exhibiting clear surface pattern or causing separation of a coating layer and elution due to decomposition.

Examples of the preferred fluorine-containing ethylenic polymer having functional group used in the present invention are as follows.

(I) A polymer comprising 0.05 to 30% by mole of the fluorine-containing ethylenic monomer (a-1) having functional group and 70 to 99.95% by mole of tetrafluoroethylene (reactive PTFE).

The polymer is the most excellent in heat resistance, chemical resistance and non-sticking property, and further is superior from the viewpoint of sliding property (friction resistance, abrasion resistance).

(II) A polymer comprising 0.05 to 30% by mole of the fluorine-containing ethylenic monomer (a-1) having functional group based on the total amount of monomers, and further based on the total amount of monomers excluding the monomer (a-1), 85 to 99.7% by mole of tetrafluoroethylene and 0.3 to 15% by mole of a monomer represented by the formula (2):

$$CF_2=CF-R_f^1 \tag{2}$$

wherein $R_f^1$ is $CF_3$ or $OR_f^2$, in which $R_f^2$ is a perfluoroalkyl group having 1 to 5 carbon atoms. For example, there is a tetrafluoroethylene-perfluoro(alkyl vinyl ether) copolymer having functional group (reactive PFA) or a tetrafluoroethylene-hexafluoropropylene polymer having functional group (reactive FEP).

The polymer has heat resistance, chemical resistance and non-sticking property nearly equivalent to those of the above-mentioned reactive PTFE (I), and further is superior from the points of possessing transparency and being melt-processable and from the viewpoint that even when coated in the form of coating, it is possible to make the coating film transparent and its surface smooth by heat.

(III) A polymer comprising 0.05 to 30% by mole of the fluorine-containing ethylenic monomer (a-1) having functional group based on the total amount of monomers, and further based on the total amount of monomers excluding the monomer (a-1), 40 to 80% by mole of tetrafluoroethylene, 20 to 60% by mole of ethylene and 0 to 15% by mole of other copolymerizable monomer (ethylene-tetrafluoroethylene polymer (III) having functional group (reactive ETFE)).

The polymer is superior from the viewpoint of excellent heat resistance, stain-proofing property, weather resistance and transparency, and further excellent mechanical strength, hardness and rigidity and from the point that molding and combining with other substrate (lamination, etc.) are easy because of good melt-flowability.

The fluorine-containing ethylenic polymer having functional group can be prepared by copolymerizing the fluorine-containing ethylenic monomer (a) having functional group and the fluorine-containing ethylenic monomer (b) having no functional group through known polymerization methods. Among them, radical copolymerization method is mainly used. Namely means for initiating the polymerization is not particularly limited if the polymerization advances radically. For example, the polymerization is initiated by an organic or inorganic radical polymerization initiator, heat, light, ionizing radiation, etc. The polymerization can be carried out by solution polymerization, bulk polymerization, suspension polymerization, emulsion polymerization, or the like. A molecular weight of the polymer is regulated by a concentration of the monomers used in the polymerization, a concentration of the initiator, and a concentration of a chain transfer agent and polymerization temperature. Amounts of components of the prepared copolymer can be regulated by amounts of monomers used.

The fluorine-containing ethylenic polymer having functional group and explained above can be made into various forms as a material to be applied to a substrate. Represented examples of its application are a coating material or a material in the form of film. The polymer may be formed into a molded article.

In the present invention, the above-mentioned fluorine-containing ethylenic polymer having functional group can be applied to a substrate in the form of coating to give a composite material for cooking apparatuses.

In the present invention, in case of use in the form of coating, the polymer is capable of being in the form of aqueous dispersion, organic solvent dispersion, powder (including granulate), organosol or an aqueous emulsion of organosol. Among them, from environmental and safety points of view, it is preferable to apply in the form of an aqueous dispersion or powder (powder coating).

The coating may be applied so that excellent adhesive property of the fluorine-containing ethylenic polymer having functional group to the substrate is exhibited. The coating may be applied in one layer or as a primer.

In the present invention, the aqueous dispersion for fluorine-containing coating composition is prepared by dispersing, in water, particles of the above-mentioned fluorine-containing ethylenic polymer having functional group. By introducing a functional group in the fluorine-containing polymer, dispersion stability of fine particles in the aqueous dispersion is enhanced and a coating composition having good storage stability can be obtained, and further leveling property and transparency of a coating film are enhanced.

As the fluorine-containing ethylenic polymer having functional group, from the viewpoint of heat resistance, non-sticking property, and friction resistance, the reactive PTFE (I) is preferred, and from the viewpoint of heat resistance, non-sticking property and transparency, the reactive PFA or reactive FEP (II) is preferred.

The above-mentioned aqueous dispersion is preferably in a state of 0.01 to 1.0 μm fine particles of the polymer being dispersed in water. A surfactant may be blended in the aqueous dispersion for the purpose of dispersion stability. Also to the aqueous dispersion can be added additives to be used usually such as pigment, surfactant, defoaming agent, viscosity control agent and leveling agent in amounts not lowering remarkably heat resistance, chemical resistance, non-sticking property and friction resistance.

The aqueous dispersion for fluorine-containing coating composition can be prepared through various methods. Examples of the method are, for instance, a method wherein a powder of the fluorine-containing polymer having functional group and prepared by suspension polymerization is finely pulverized and then the pulverized powder is dispersed homogeneously into an aqueous dispersion medium with a surfactant, a method wherein a fluorine-containing aqueous dispersion is prepared at the same time as emulsion polymerization and further a surfactant and additives are added as the case demands, and the like methods. From the viewpoint of productivity and quality (for making particle size smaller and more uniform), a method of preparing an aqueous dispersion directly by emulsion polymerization is preferred.

A concentration of the polymer in the aqueous dispersion varies depending on desired coating thickness, concentration and viscosity of a coating composition, coating method, etc., and is usually selected in the range of from about 5% by weight to about 70% by weight.

The coating method is not particularly limited. The coating may be carried out by brush coating, spray coating, roll coating or the like, and then dried and sintered at a temperature of not less than the melting point of the polymer and not more than its decomposition temperature depending on kind of the polymer.

The coating thickness may be selected depending on application, purpose, substrate, etc. For example, the coating thickness is from about 5 $\mu$m to about 200 $\mu$m, preferably from 10 to 100 $\mu$m.

The powder coating composition of the present invention comprises a powder of the above-mentioned fluorine-containing ethylenic polymer having functional group.

Further from the viewpoint of heat resistance, non-sticking property, corrosion resistance and chemical resistance, the reactive PFA or reactive FEP (II) is preferred, and from the viewpoint of stain-proofing property, processability and transparency, the reactive ETFE (III) is preferred.

As the fluorine-containing powder coating composition, there can be used preferably one in the form of powder or in the granular form having a particle size of 10 to 1,000 $\mu$m and an apparent density of 0.3 to 1.2 g/cc.

To the fluorine-containing powder coating composition can be added optionally additives in amounts not lowering remarkably characteristics such as heat resistance of the fluorine-containing resin. Examples of the additives are, for instance, pigments such as carbon powder, titanium oxide and cobalt oxide; reinforcing agents such as glass fiber powder, carbon fiber powder and mica; amine anti-oxidant; organic sulfur anti-oxidant; organotin anti-oxidant; phenolic anti-oxidant; thermal stabilizer such as metal soap; leveling agent; anti-static agent; and the like.

The fluorine-containing powder coating composition and the additives may be admixed in the form of powder (dry method) or in the form of slurry (wet method), and the mixing in the form of powder is preferred. As the mixing equipment, there can be used a conventional mixer or pulverizer, for example, a sand mill, V blender, ribbon blender or the like.

The fluorine-containing powder coating composition is generally coated by electrostatic spray coating, fluidized-bed dip coating, rotolining, etc., and then sintered at a temperature of not less than the melting point of the polymer and not more than its decomposition temperature depending on kind of the polymer, and thus a good coating film can be formed.

In general in case of electrostatic powder spray coating, a coating film having a thickness of 10 to 200 $\mu$m is formed, and in case of rotolining, a coating film having a thickness of 200 to 1,000 $\mu$m is formed.

Further the fluorine-containing ethylenic polymer having functional group which is used for a fluorine-containing coating material can be used, by utilizing its adhesive property, as a primer layer for a fluorine-containing coating composition which has good heat resistance at the time when applying a fluorine-containing resin having no functional group on surfaces of substrates such as metal and glass.

The primer for a fluorine-containing coating composition comprises the above-mentioned fluorine-containing ethylenic polymer having functional group.

As the primer, the same fluorine-containing polymer as mentioned above can be used. The primer is selected optionally depending on kind of a substrate surface, kind of the fluorine-containing polymer to be applied through the primer (kind of a top coat), etc. It is preferable in general that the primer for a fluorine-containing coating composition is one which has the same structure as the fluorine-containing polymer to be applied thereon and contains a functional group.

That combination of the primer and top coat assures good compatibility between the fluorine-containing polymer to be used as the primer and the fluorine-containing polymer to be applied thereon, and can give not only good adhesion to the substrate surface but also good intercoat adhesive strength between the primer layer and the top coat layer. Also even in case of the use at high temperature, unlike the case where the primer mixed with other resin component is used, intercoat adhesion failure to be caused due to a difference in thermal shrinkage between the polymers, cracking, pin hole, etc. are hard to arise. Further since the whole coating film comprises the fluorine-containing polymer, it can be used sufficiently for applications requiring transparency and vivid coloring. Still further excellent heat resistance, chemical resistance, non-sticking property and friction resistance can be exhibited more effectively even if a layer of fluorine-containing polymer having no functional group is formed on the outermost surface of the coating film.

Examples of the fluorine-containing polymer having no functional group and used for a top coat layer are PTFE, PFA, FEP, ETFE, PVdF and VdF copolymers.

As the primer for fluorine-containing coating composition, there can be used the above-mentioned fluorine-containing ethylenic polymer having functional group. In case where a substrate is coated with PTFE, it is preferable to use the primer selected from the reactive PTFE (I), reactive PFA and reactive FEP (II). It is particularly preferable to use, as the primer, thermo-melting reactive PFA or FEP (II) since it is possible to thermo-melt and strongly adhere to a substrate surface by sintering. In case where a substrate is coated with PFA or FEP, it is preferable to use, as the primer, reactive PFA or FEP (II). Further in case where a substrate is coated with ETFE, it is particularly preferable to use, as the primer, reactive ETFE (III) from the viewpoint of adhesion and transparency.

As a coating method using a primer layer, there can be used preferably a method of coating a fluorine-containing polymer, which mainly comprises the following three steps;

(First step) a step for applying, to a substrate surface, the primer for fluorine-containing coating composition comprising the above-mentioned fluorine-containing polymer having functional group, (Second step) a step for applying a fluorine-containing coating composition comprising a fluorine-containing polymer having no functional group, to the primer layer formed in the above first step, and (Third step) a step for sintering the laminated article obtained in the above first and second steps.

Further the primer layer applied in the above first step may be set by drying at 80° to 150° C. for about 5 minutes to about 30 minutes prior to the second step (2 coats/1 bake) or may be sintered, for example, at a temperature higher than the melting temperature thereof prior to the second step (2 coats/2 bakes).

The method for applying the primer in the first step is optionally selected depending on the form of the primer. For example, in case where the fluorine-containing primer is in the form of aqueous dispersion, spray coating, spin coating, brush coating and dip coating methods are used. Also in case of the form of powder coating composition, coating methods such as electrostatic coating, fluid-bed dip coating and rotolining are employed.

A thickness of the primer layer may vary depending on purpose, application, kind of a substrate surface and form of the primer. The thickness is from 1 to 50 μm, preferably from 2 to 20 μm. Since the thickness of the primer is in general thin as mentioned above, it is preferable to coat the primer in the form of aqueous dispersion by spray coating, etc.

The method for applying the coating composition comprising a fluorine-containing polymer having no functional group to the primer layer in the second step is optionally selected depending on kind of the fluorine-containing polymer, form of the coating, purpose and application. For example, in case of an aqueous dispersion and organic solvent dispersion, usually spray coating, brush coating, roll coating and spin coating are carried out. In case of a powder coating composition, electrostatic coating, fluid-bed dip coating or rotolining are carried out.

A coating thickness of the fluorine-containing polymer in this step varies largely depending on purpose, application and coating method. The thickness is in general from 5 to 50 μm, preferably from about 10 μm to about 30 μm in case of spray coating. When a thick coating film is desired by using a powder coating composition, it is possible to apply at 20 to 2,000 μm thick in case of electrostatic coating, and at 0.3 to 10 μm thick in case of rotolining.

Sintering conditions in the third step are optionally selected depending on kinds of fluorine-containing polymers (component, melting point, etc.) of the primer layer and the top layer thereon. The sintering is carried out in general at a temperature of not less than the melting point of the both fluorine-containing polymers. A sintering time varies depending on the sintering temperature, and is from five minutes to three hours, preferably from about 10 minutes to about 30 minutes. For example, when coating with PTFE, PFA and FEP, sintering is carried out at 320° to 400° C., preferably 350° to 400° C.

Then technique for applying the above-mentioned fluorine-containing ethylenic polymer having functional group in the form of film to produce a composite material for cooking apparatuses is explained.

Merits of applying in the form of film are as follows.

①  A film comprising a fluorine-containing ethylenic polymer having functional group is advantageous from the viewpoint of processing since an applicator necessary for a hot-melt adhesive is not required, and the film can be adhered by thermocompression bonding while being put on a substrate or inserted between substrates.

② Further since a uniform adhesive layer is formed on the whole surface of substrate, a film free from nonuniform adhesion and having uniform adhesive strength can be obtained, and thus can be applied to a substrate having poor or no compatibility therewith.

③ Further the film can be cut into various shapes, and thus is advantageous from the viewpoint of a small loss in processing work, good working environment and cost.

The preferred fluorine-containing polymer film of the present invention may be one which is produced by molding the above-mentioned fluorine-containing ethylenic polymer having functional group. The film can be adhered to various substrates without surface treating and using usual adhesives, thereby giving excellent characteristics of the fluorine-containing polymer to a substrate.

Though it is possible to produce adhesive films from the above-mentioned fluorine-containing polymers having functional group by using various adhesives depending on application, purpose, film production process and adhering method, the above-mentioned copolymer (III) (reactive PFA or reactive FEP) or copolymer (IV) (reactive ETFE) is preferred since the adhesive film itself has heat resistance, chemical resistance, mechanical properties and non-sticking property; efficient film molding represented by melt-molding can be carried out; the film has good moldability; making the film thin and uniform is possible; and it is possible to melt the film by various thermocompression bonding methods to adhere strongly and beautifully to various substrates. Particularly preferred functional group is hydroxyl from the viewpoint of heat resistance.

A thickness of the fluorine-containing film is selected depending on purpose and application and is not limited particularly. The thickness is from 10 to 3,000 μm, preferably from 20 to 500 μm, particularly preferably from 40 to 300 μm.

In case of too thin films, special production method is required; it is difficult to handle the film at the time of adhering; wrinkling, breaking and poor appearance occur easily; and there is a case where adhesive strength, mechanical strength, chemical resistance and weather resistance become insufficient. Too thick film is disadvantageous from the viewpoint of cost and workability at the time of bonding to one unit.

In the present invention, the fluorine-containing polymer film may be used alone or can be used in the form of laminated film comprising the film (adhesive layer) of fluorine-containing ethylenic polymer having functional group and the film (surface layer) of fluorine-containing ethylenic polymer having no functional group.

Namely one surface of the film is a layer comprising a fluorine-containing ethylenic polymer having functional group and has adhesive property to other substrate, and another surface of the film is a layer comprising usual fluorine-containing polymer. By bringing the surface of the fluorine-containing ethylenic polymer having functional group into contact to the substrate and adhering it to the substrate by thermocompression bonding, etc., excellent characteristics of the fluorine-containing polymer such as non-sticking property, stain-proofing property, friction resistance, weather resistance and chemical resistance can be given to the substrate for cooking apparatuses or the composite material comprising the substrate.

In the present invention, a thickness of the two-layered laminated film of fluorine-containing polymer is selected depending on purpose and application, and is not limited particularly. The total thickness of two layers is from 20 to 5,000 μm, preferably from 40 to 1,000 μm, particularly preferably from 100 to 500 μm.

A thickness of each layer which can be used is from 5 to 1,000 μm, preferably from 10 to 500 μm, particularly preferably from 10 to 200 μm of the adhesive layer, and from about 15 µm to about 4,995 µm, preferably from 30 to 990 µm, particularly preferably from 90 to 490 µm of the fluorine-containing polymer layer (surface layer).

The film for the surface layer may be adhered after adhering the film for the adhesive layer to a substrate.

To the film of fluorine-containing polymer having functional group can be optionally incorporated proper additives such as a reinforcing agent, filler, stabilizer, ultraviolet ray absorber, pigment, etc. in an amount not lowering characteristics of the film. Those additives make it possible to improve thermal stability, surface hardness, abrasion resistance, weather resistance and electrostatic charge, etc.

The fluorine-containing film of the present invention can be produced, depending on kind of polymers used and desired shape of the film, by various methods such as thermal melting method, extrusion method, cutting method, solvent-casting method and a method of applying a powder or an aqueous dispersion or organic solvent dispersion to form a continuous coating film.

For example, a polymer which comprises the above-mentioned reactive PTFE and is difficult to be melt-molded can be molded by compression molding, extrusion molding (ram extrusion, paste extrusion, roll press, etc.) or the like. A polymer such as reactive PFA, FEP or ETFE which is melt-moldable is molded by compression molding and extrusion molding, and melt-extrusion molding is particularly preferred from the viewpoint of productivity and product quality.

Namely one surface of the film is a layer comprising a fluorine-containing ethylenic polymer having functional group and has adhesive property to other substrate, and another surface of the film is a layer comprising usual fluorine-containing polymer. By bringing the surface of the fluorine-containing ethylenic polymer having functional group into contact to the substrate and adhering it to the substrate by thermocompression bonding, etc., excellent characteristics of the fluorine-containing polymer such as chemical resistance, weather resistance, stain-proofing property, non-sticking property, friction resistance and electrical properties (high-frequency electric insulation property) can be given to the substrate or the composite material comprising the substrate.

In the present invention, a thickness of the two-layered laminated film of fluorine-containing polymer is selected depending on purpose and application, and is not limited particularly. The total thickness of two layers is from 20 to 5,000 µm, preferably from 40 to 1,000 µm, particularly preferably from 100 to 500 µm.

A thickness of each layer which can be used are from 5 to 1,000 µm, preferably from 10 to 500 µm, particularly preferably from 10 to 200 µm of the adhesive layer, and from about 15 µm to about 4,995 µm, preferably from 30 to 990 µm, particularly preferably from 90 to 490 µm of the fluorine-containing polymer layer (surface layer).

The film for the surface layer may be adhered after adhering the film for the adhesive layer to a substrate.

To the film of fluorine-containing polymer having functional group can be optionally incorporated proper additives such as a reinforcing agent, filler, stabilizer, ultraviolet ray absorber, pigment, etc. in an amount not lowering characteristics of the film. Those additives make it possible to improve thermal stability, surface hardness, abrasion resistance, weather resistance and electrostatic charge, etc.

The fluorine-containing film of the present invention can be produced, depending on kind of polymers used and desired shape of the film, by various methods such as thermal melting method, extrusion method, cutting method, solvent-casting method and a method of applying a powder or an aqueous dispersion or organic solvent dispersion to form a continuous coating film.

For example, a polymer which comprises the above-mentioned reactive PTFE and is difficult to be melt-molded can be molded by compression molding, extrusion molding (ram extrusion, paste extrusion, roll press, etc.) or the like. A polymer such as reactive PFA, FEP or ETFE which is melt-moldable is molded by compression molding and extrusion molding, and melt-extrusion molding is particularly preferred from the viewpoint of productivity and product quality.

Bonding of the two films into one laminated film can be carried out by a method of overlapping the respective molded films for adhesive layer and surface layer and then compression-molding; a method of applying, to a molded film, the other one; a method of carrying out film molding and bonding of films at the same time through multi-layer co-extrusion molding method, or the like method. Among them, the multi-layer co-extrusion molding method is preferred from the viewpoint of productivity and product quality.

Adhesion of the film of fluorine-containing polymer having functional group to a substrate is achieved through thermal activation by heating, etc. Further thermo-melting adhesion is preferable. Represented examples of the adhering method are heating roller method and heat press method. Also there are other methods such as high-frequency heating, microwave heating, vacuum compression (vacuum press, etc.) and pneumatic press. Those methods can be optionally selected depending on kind and shape of a substrate, condition and kind of film, etc.

Examples of the substrate on which the fluorine-containing polymer having functional group can be adhered, are a metallic substrate, ceramic substrate, resin substrate, and the like.

Metals of the metallic substrate encompass metal, alloys of two or more metals, metal oxide, metal hydroxide, metal salts such as carbonate and sulfate, etc. Among them, metal, metal oxide and alloys are more preferable from the viewpoint of adhesive property.

Examples of the metallic substrate are metals and metal compounds of aluminum, iron, nickel, titanium, molybdenum, magnesium, manganese, copper, silver, lead, tin, chromium, beryllium, tungsten and cobalt, alloys of two or more thereof, etc.

Examples of the alloys are alloy steels such as carbon steel, Ni steel, Cr steel, Ni—Cr steel, Cr—Mo steel, stainless steel, silicon steel and Permalloy; aluminum alloys such as Al—Cl, Al—Mg, Al—Si, Al—Cu—Ni—Mg and Al—Si—Cu—Ni—Mg; copper alloys such as brass, bronze, silicon bronze, silicon brass, nickel silver and nickel bronze; nickel alloys such as nickel manganese (D nickel), nickel-aluminum (Z nickel), nickel-silicon, Monel metal, Constantan, nichrome Inconel and Hastelloy; and the like.

Further as the aluminum-based metal, there can be used pure aluminum; aluminum oxide; and aluminum alloys for casting and expanding such as Al—Cu, Al—Si, Al—Mg, Al—Cu—Ni—Mg, Al—Si—Cu—Ni—Mg alloys, high tensile aluminum alloy and corrosion resistant aluminum alloy.

Also as the iron-based metals, there can be used pure iron, iron oxide, carbon steel, Ni steel, Cr steel, Ni—Cr steel, Cr—Mo steel, Ni—Cr—Mo steel, stainless steel, silicon steel, Permalloy, non-magnetic steel, magnet steel, cast iron, etc.

Also the fluorine-containing polymer having functional group can be adhered to a substrate which was subjected to, for the purpose of preventing corrosion of metal, coating of other metal by electroplating, hot dipping, chromatizing, siliconizing, colorizing, sheradizing, metal spraying, etc.; forming a phosphate film by phosphatization; forming metal oxide by anodizing or heat-oxidizing; or electrochemical corrosion prevention.

Further for the purpose of enhancing adhesion, the surface of metallic substrate may be subjected to chemical preparation with a phosphoric acid, sulfuric acid, chromic acid, oxalic acid, etc., or may be subjected to surface roughening by sand blasting, shot blasting, grit blasting, honing, paper scratching, wire scratching, hair line finishing, etc. For the purpose of exhibiting clear surface pattern of the substrate, the metal surface may be subjected to coloring, printing, etching, etc.

In case of the above-mentioned aluminum or aluminum alloy substrate, in order to enhance corrosion resistance, surface hardness and adhesive property of the substrate, it is possible to form an oxide film (alumite) on the substrate by anodizing with caustic soda, oxalic acid, sulfuric acid or chromic acid and also use the aluminum or aluminum alloy substrate subjected to other surface treatments mentioned above.

Further there may be used a substrate plated, on its surface, other metal as mentioned above, for example, steel plate subjected to hot-dip zinc-plating, hot-dip zinc alloy plating, aluminum plating, zinc-nickel plating, zinc-aluminum plating, or the like; a substrate coated with other metal by diffusion coating or thermal spraying; a substrate, on which an oxide film is formed by chemical conversion treatment with chromic acid or phosphoric acid or heat-treatment; a substrate subjected to electric corrosion preventing treatment (for example, galvanized steel plate); or the like.

Examples of the ceramic substrate are, for instance, glass, pottery, porcelain, etc.

Components of glass are not particularly limited. Examples are silica glass, lead glass, non-alkali glass, alkali glass, etc.

Examples of the resin substrate are, for instance, an acrylic resin, polycarbonate, heat resistant engineering plastic, thermosetting resin, etc.

Examples of the above-mentioned substrate used usually for the composite material for cooking apparatuses of the present invention as a metallic substrate are, for instance, ① cold rolled steel sheet,
② plated steel sheet, for example, Zn-plated steel sheet, Zn alloy-plated steel sheet, Al-plated steel sheet, Al alloy-plated steel sheet, Cr-plated steel sheet (TFS), Ni-plated steel sheet, Cu-plated steel sheet, galvanized steel sheet, etc.,
③ aluminum sheet,
④ titanium sheet,
⑤ stainless steel sheet, and the like.

In addition, where transparency is required, a ceramic substrate of glass and a resin substrate of acrylic resin and polycarbonate are usually used.

It is preferable that the form of the substrate is the same as a form of a finished product from the viewpoint that there is a case where processability is difficult depending on kind of cooking apparatuses.

The composite material of the present invention can be used on various cooking apparatuses firstly because the fluorine-containing resin is applied to a substrate with good adhesive property and secondary because the fluorine-containing resin possesses good transparency (clear surface pattern), heat resistance, non-sticking property, stain-proofing property, water- and oil repelling property, and the like.

Cooking apparatuses and parts thereof to which the composite material for cooking apparatuses of the present invention can be suitably applied are classified by fields they belong to, and exemplified below. Accordingly the present invention also relates to cooking apparatuses and parts thereof mentioned below.

Also those classified cooking apparatuses and parts thereof are shown in Tables 1 to 7.

① Pots and Pans
  (a) Inner surface, inner lid, etc. of electric pot including electric water heater In those applications, stain-proofing property (for fur), hot water resistance and antibacterial property of the composite material for cooking apparatuses of the present invention can be used particularly effectively.

(b) Inner surface of inner pot, inner lid, etc. of gas and electric rice cookers and rice cookers with rice washing mechanism, etc.

In those applications, non-sticking property (for rice and scorching) and heat resistance of the composite material for cooking apparatuses of the present invention can be used particularly effectively.

② Cooking Apparatuses
  (a) Surfaces of frying pan, vat, household hand mixer for cooking, crate, kitchen knife, molder for bread, reverse sheet for rolling dough, dough dividing and rounding machine for bread, etc., inner surface of mixing bowl, rice chest, etc. and blade of the above-mentioned mixer.

In those applications, non-sticking property (scorching and cohering stains), stain-proofing property and heat resistance of the composite material for cooking apparatuses of the present invention can be used particularly effectively.

(b) Inner surface, blade, etc. of electric food processors such as electric food crusher for domestic use, electric food crusher, electric meat grinder for kitchen use, electric blender for kitchen use and electric mixer for kitchen use.

In those applications, non-sticking property (for vegetable and meat juice) and stain-proofing property of the composite material for cooking apparatuses of the present invention can be used particularly effectively.

③ Gas Range with Grill
  (a) Top panel, side panel, surface of gas ranges such as gas container built-in Type Range, and drip pan cover thereof, etc.

In those applications, non-sticking property (for oil stains), heat resistance and transparency (property for exhibiting clear color and pattern) of the composite material for cooking apparatuses of the present invention can be used particularly effectively.

④ Ranges with Oven Including Toaster, Range, etc.
  (a) Inner surfaces (metallic portion) of ovens (range for kitchen) such as oven for shop use, electric oven (including oven for shop use), electric oven with heating cabinet for shop use, cooking oven for shop use and cooking range for shop use; ovens for making bread such as baking oven for shop use and automatic baking apparatus for domestic use; electric oven and toaster such as toaster and toaster for bread; and microwave range such as microwave range for shop use and microwave range with oven; and pans for ranges.

In those applications, non-sticking property (for oil and scorching), stain-proofing property and heat resistance of the composite material for cooking apparatuses of the present invention can be used particularly effectively.

(b) Inner surface of door of ranges with oven raised in above (a)

In those applications, non-sticking property, heat resistance and transparency of the composite material for cooking apparatuses of the present invention can be used particularly effectively. In case of microwave range, energy ray resistance can be used particularly effectively.

⑤ Pots and Pans (a) Inner surface of pots and pans such as glass pot, enameled pot, aluminum pot, electric frying pot, electric tempura pot, electric pressure pot and electric pressure pot for stew, etc.

In those applications, non-sticking property (for scorching, cohering stains and oil in case of the frying pot and Tempura pot) and heat resistance of the composite material for cooking apparatuses of the present invention can be used particularly effectively.

(b) Lid, etc. of pots and pans raised in above (a).

In those applications, not only the characteristics raised in above (a) but also transparency of the composite material for cooking apparatuses of the present invention can be used particularly effectively.

⑥ Garbage Disposer

Inner surface, etc. of garbage disposer for domestic use and garbage (waste) disposer for making compost.

In those applications, non-sticking property and stain-proofing property of the composite material for cooking apparatuses of the present invention can be used particularly effectively.

⑦ Other Heating Apparatuses for Cooking (a) Heating surface, lid, etc. of griddle In those applications, non-sticking property (for scorching and cohering stains) and heat resistance of the composite material for cooking apparatuses of the present invention and transparency thereof in case of the lid can be used particularly effectively.

(b) Cooking surface, etc. of electromagnetic cooking apparatuses such as electromagnetic range and oven.

In those applications, non-sticking property, heat resistance and transparency of the composite material for cooking apparatuses of the present invention can be used particularly effectively.

(c) Inner surface, door inner surface, lid, etc. of electric steamer such as food steamer for shop use.

In those applications, non-sticking property, stain-proofing property, heat resistance and steam resistance of the composite material for cooking apparatuses of the present invention can be used particularly effectively.

(d) Inner surface, lid, etc. of noodle boiler for shop use.

In those applications, non-sticking property, stain-proofing property, heat resistance and hot water resistance of the composite material for cooking apparatuses of the present invention can be used particularly effectively.

(e) Inner surface, inner surface (metallic portion) and door inner surface of cooking roaster for shop use, pan for range, etc.

In those applications, non-sticking property (for scorching and cohering stains) and heat resistance of the composite material for cooking apparatuses of the present invention can be used particularly effectively.

(f) Inner surface, etc. of tableware and can washer for shop use

In those applications, non-sticking property, stain-proofing property and hot water resistance of the composite material for cooking apparatuses of the present invention can be used particularly effectively.

(g) Inner surface, door inner surface, etc. of heating cabinet for shop use.

In those applications, non-sticking property, stain-proofing property, transparency and heat resistance of the composite material for cooking apparatuses of the present invention can be used particularly effectively.

Further examples of the cooking apparatuses other than those mentioned above, to which the composite material for cooking apparatuses of the present invention can be preferably applied, are as follows.

Examples of cooking apparatuses within the range of above ① (b) are rice gruel cooker, rice warmer, etc.

Examples of cooking apparatuses within the range of above ② (a) are various cooking utensils (for slicing), cooking utensils, cooking appliance, cooking machine (for food, etc.), iron plate for cooking, cooking appliances and facilities, barbecue utensils, food processing machine (with press machine, etc.), chocolate manufacturing machine and ancillary temperature adjusting equipment thereof for starting material, etc.

Examples of cooking appliances within the range of above ② (b) are cooking appliance for mixing, vegetable slicer, food slicer, peeler, machine for cutting into cubes, food cutter, meat chopper, meat slicer, meat tenderizer, cutter mixer, mixer, food mixer, blender, apple processor, continuous egg opener, soy bean curd cutter, bread crumb coating machine, vegetable washer, etc.

Examples of cooking apparatuses within the range of above ③ are range, portable heater, electric range, gas range, gas oven with grill, electric oven with grill, etc.

Examples of cooking apparatuses within the range of above ④ are gas salamander, electric salamander, convention oven, baking oven for making bread, etc.

Examples of cooking apparatuses within the range of above ⑤ are wok set for Chinese dishes, one-handed pot, double-handed pot, gas fryer, Tempura fryer, oil filter unit, buckwheat pot, rotary pot, etc.

Examples of cooking apparatuses within the range of above ⑦ are fryer for dumpling stuffed with minced meat, electromagnetic range, gas steamer, electric steamer, etc.

TABLE 1

| Classification of product | Typical finished product | Characteristics needed | Defects of prior art | Effect of the invention |
|---|---|---|---|---|
| Pots | Electric pot | Stain-proofing property for fur, hot water resistance, antibacterial property | Primer is necessary. Process-ability is not good and surface pattern is unclear. | Adhesive property, processabil-ity (no primer required) |
|  | Electric rice cooker | Non-sticking property for scorched rice, heat resistance | Primer is necessary. Process-ability is not good and surface pattern is unclear. | Adhesive property, processabil-ity (no primer required) |
| Cooking appliances and utensils | Frying pan | Non-sticking property for scorch and cohered stain, stain-proofing | Process-ability and transparency are not good and surface | Adhesive property, processabil-ity (no primer |

TABLE 1-continued

| Classification of product | Typical finished product | Characteristics needed | Defects of prior art | Effect of the invention |
|---|---|---|---|---|
| | | property, heat resistance | pattern is unclear. | required), transparency, clearer surface pattern |
| | Electric food processor | Non-sticking property for vegetable and juice of meat, stain-proofing property | Processability and transparency are not good and surface pattern is unclear. | Adhesive property, improvement of processability (no primer required), transparency, clearer surface pattern |
| Oven with grill | Gas oven | Non-sticking property for stained oil, heat resistance transparency, clear surface (color, pattern) | Processability is not good and surface pattern is unclear. | Adhesive property, processability (no primer required), transparency, clear surface pattern |
| Range with oven (toaster, range) | Oven (kitchen range) | Non-sticking property for oil and scorch, stain-proofing property, heat resistance, non-sticking property, transparency | Processability, heat resistance and durability are not good. Wipe-off property is not good (No articles treated with fluorine-containing resin are available). Transparency is not good. | Adhesive property (processability), clear surface pattern, transparency |
| | Oven for baking bread | Non-sticking property for oil and scorch, stain-proofing property, heat resistance, non-sticking property, transparency | Processability, heat resistance and durability are not good. Wipe-off property is not good (No articles treated with fluorine-containing resin are available). Transparency is not good. | Adhesive property (processability), clear surface pattern, transparency |
| | Electric oven and toaster | Non-sticking property for oil and scorch, stain-proofing property, heat resistance, non-sticking property, transparency | Processability, heat resistance and durability are not good. Wipe-off property is not good (No articles treated with fluorine-containing resin are available). Transparency is not good. | Adhesive property (processability), clear surface pattern, transparency |
| | Microwave oven | Non-sticking property, heat resistance, resistance to energy ray, transparency | Processability, heat resistance and durability are not good. Wipe-off property is not good (No articles treated with fluorine-containing resin are available). Transparency is not good. | Adhesive property (processability), heat resistance, durability, maintenance of transparency |

TABLE 2

| Classification of product | Typical finished product | Characteristics needed | Defects of prior art | Effect of the invention |
|---|---|---|---|---|
| Pot and pan | Glass pot | Non-sticking property for scorch and cohering stains, heat resistance, transparency | Wipe-off property is not good (No articles treated with fluorine-containing resin are available). Heat resistance and transparency are not good. | Adhesive property (processability), transparency |
| | Electric deep fryer | Non-sticking property for oil, heat resistance, transparency | Processability, heat resistance and wipe-off property are not good (No articles treated with fluorine-containing resin are available). Surface pattern is unclear. Transparency is not good. | Adhesive property, processability (no primer required), transparency |
| | Electric pressure pot | Non-sticking property for scorching and cohering stains, heat resistance, transparency | Processability, heat resistance and wipe-off property are not good (No articles treated with fluorine-containing resin are available). Surface pattern is unclear. Transparency is not good. | Adhesive property, processability (no primer required), transparency |

TABLE 2-continued

| Classification of product | Typical finished product | Characteristics needed | Defects of prior art | Effect of the invention |
|---|---|---|---|---|
| | Electric pressure pot for stew | Non-sticking property for scorching and cohering stains, heat resistance, transparency | Processability, heat resistance and wipe-off property are not good (No articles treated with fluorine-containing resin are available). Surface pattern is unclear. Transparency is not good. | Adhesive property, processability (no primer required), transparency |

TABLE 3

| Classification of product | Typical finished product | Characteristics needed | Defects of prior art | Effect of the invention |
|---|---|---|---|---|
| Other heating appliances for cooking | Griddle | Non-sticking property for scorch and cohering stains, heat resistance, non-sticking property, transparency | Processability, abrasion resistance and heat resistance are not good. Wipe-off property is not good (No articles treated with fluorine-containing resin are available). Transparency is not good. | Adhesive property, processability (no primer required), heat resistance, abrasion resistance, transparency |
| | Electromagnetic cooking appliance | Non-sticking property, heat resistance, transparency | Processability is not good. | Adhesive property, processability (no primer required), transparency |
| | Electric cooking steamer | Non-sticking property, stain-proofing property, heat resistance, steam resistance | Processability is not good. | Adhesive property, processability (no primer required) |
| | Noodles boiling apparatus for shop use | Non-sticking property, stain-proofing property, heat resistance, hot water resistance | Processability is not good. | Adhesive property, processability (no primer required) |
| Other heating appliances for cooking | Cooking roaster for shop use | Non-sticking property for scorch and cohering stains, heat resistance | Processability and heat resistance are not good. | Adhesive property, processability (no primer required), transparency |

TABLE 3-continued

| Classification of product | Typical finished product | Characteristics needed | Defects of prior art | Effect of the invention |
|---|---|---|---|---|
| | Tablewares and cans washing machine for shop use | Non-sticking property, stain-proofing property, hot water resistance | Processability is not good. Surface pattern is unclear. | Adhesive property, processability (no primer required) |
| | Heat cabinet for shop use | Non-sticking property, stain-proofing property, transparency, heat resistance | Processability and transparency are not good. Surface pattern is unclear. | Adhesive property, processability (no primer required) |
| Garbage disposer | Garbage disposer | Non-sticking property, stain-proofing property | Processability is not good. Surface pattern is unclear. | Adhesive property, processability (no primer required) |

TABLE 4

| Classification of product | Typical finished product | Similar product | Application |
|---|---|---|---|
| Pots | Electric pot | | Inner surface, inner lid |
| | | Electric water heater | Inner surface, inner lid |
| | Electric rice cooker | | Inner surface of inner pot, inner lid |
| | | Rice cooker (gas, electric) | Inner surface of inner pot, inner lid |
| | | Rice cooker (with rice washing mechanism for shop use) | Inner surface of inner pot, inner lid |
| Cooking appliances and utensils | Frying pan | | Surface |
| | | Vat | Surface |
| | | Mixing bowl | Inner surface |
| | | Chopping board | Surface |
| | | Household hand-operated mixer for cooking | Surface, blade |
| | | Crate | Surface |
| | | Cooking knife | Surface |
| | | Molder for making bread | Surface |
| | | Reverse sheet for making bread | Surface |
| | | Dough dividing and rounding machine for making bread | Surface |
| | | Rice chest | Inner surface |
| | Electric food processor | | Inner surface, blade |
| | | Household electric food crusher | Inner surface Blade |
| | | Electric food crusher | Inner surface Blade |
| | | Electric meat grinder for kitchen use | Inner surface Blade |
| | | Electric blender for kitchen use | Inner surface Blade |
| | | Electric mixer for kitchen use | Inner surface Blade |

| Example of substrate | Preferred polymer* | Applying method | Other similar product |
|---|---|---|---|
| Metal (aluminum, galvanized steel plate) | I, II | Coating | |

TABLE 4-continued

| Example of substrate | Preferred polymer* | Applying method | Other similar product |
|---|---|---|---|
| Metal (aluminium, galvanized steel plate), Metal, Metal | I, II | Coating | Rice gruel cooker, rice warmer |
| Metal, SUS aluminum, SUS aluminum, Resin wood, SUS resin, SUS resin, SUS, SUS, Metal, Metal, Metal | I, II, III | Coating | Cooking utensils, Cooking utensils (for slicing), Cooking utensils, Cooking appliances and utensils, Cooking appliances (food), Electric cooking appliances, Cooking iron, Cooking appliances and facilities, Barbecue utensils |
| Metal, Metal, Metal, Metal glass, Metal, Metal glass, Metal, Metal glass, Metal, Metal glass, Metal | I, II, III | Coating | Food processing machine and utensils (with press machine), Cooking appliances for mixing, vegetable slicer, food slicer, peeler, cutter for cutting into small cubes, food cutter, meat chopper, meat slicer, meat tenderizer, cutter mixer, mixer, food mixer, blender, apple processor, continuous egg opening machine, soy bean curd cutter, food molder, bread crumb coating machine, vegetable washing machine |

*Fluorine-containing ethylenic polymer (A) having functional group of the present invention

TABLE 5

| Classification of product | Typical finished product | Similar product | Application |
|---|---|---|---|
| Gas oven with grill | Gas oven | | Top plate, side plate, outer surface |
| | | Gas container built-in type gas oven | Top plate, side plate, outer surface |
| | | Hood for drip pan of gas oven (made of metal) | Outer surface |
| Range with oven (toaster, range) | Oven (kitchen range) | | Inner surface (metallic portion), pan for range, Inner surface of door |
| | | Oven for shop use | Inner surface (metallic portion), pan for range, Inner surface of door |
| | | Electric oven | Inner surface (metallic portion), pan for range, Inner surface of door |

TABLE 5-continued

| Classification | Typical | Similar product | Application |
|---|---|---|---|
| | | Electric oven (with heating cabinet for shop use) | Inner surface (metallic portion), pan for range, Inner surface of door |
| | | Electric oven (for shop use) | Inner surface (metallic portion), pan for range, Inner surface of door |
| | | Oven for shop use | Inner surface (metallic portion), pan for range, Inner surface of door |
| | | Cooking oven for shop use | Inner surface (metallic portion), pan for range, Inner surface of door |
| | | Cooking range for shop use | Inner surface (metallic portion), pan for range, Inner surface of door |
| | Oven for baking bread | | Inner surface (metallic portion), pan for range, Inner surface of door |
| | | Oven for baking bread for shop use | Inner surface (metallic portion), pan for range, Inner surface of door |
| | | Bread baker (automatic, for domestic use) | Inner surface (metallic portion), pan for range, Inner surface of door |

| Example of substrate | Preferred polymer* | Applying method | Other similar product |
|---|---|---|---|
| Metal, Metal, Metal | I, II | Coating | Portable range, oven with grill, portable electric range, gas range, gas oven with grill electric oven with grill |
| Metal, Metal glass, Metal, Metal glass, Metal, Metal glass, Metal, Metal glass, Metal, Metal glass, Metal, Metal glass, Metal, Metal glass, Metal, Metal glass, Metal, Metal glass | I, II | Coating | Gas salamander, electric salamaner, convection oven |
| | | | Oven for baking bread |
| Metal, Metal glass, Metal, Metal glass | I, II | Coating | |

*Fluorine-containing ethylenic polymer (A) having functional group of the present invention

TABLE 6

| Classification of product | Typical finished product | Similar product | Application |
|---|---|---|---|
| Range with oven (toaster, range) | Electric oven and toaster | | Inner surface (metallic portion), pan for range, Inner surface of door |

TABLE 6-continued

| | | | |
|---|---|---|---|
| | | Toaster | Inner surface (metallic portion), pan for range, Inner surface of door |
| | | Toaster for bread | Inner surface (metallic portion), pan for range, Inner surface of door |
| | Microwave oven | | Inner surface (metallic portion), pan for range, Inner surface of door |
| | | Microwave range for shop use | Inner surface (metallic portion), pan for range, range, Inner surface of door |
| | | Microwave range with oven | Inner surface (metallic portion), pan for range, Inner surface of door |
| | | Rice cooker (for microwave range) | Inner surface |
| Pan and pot | Glass pot | | Inner surface, lid |
| | Enamel pot | | Inner surface, lid |
| | Aluminum pot | | Inner surface, lid |
| | Electric frying pot | | Inner surface of pot, lid Inner surface of pot, lid |
| | Electric Tempura frying pot | | Inner surface of pot, lid Inner surface of pot, lid |
| | Electric pressure pot | | Inner surface of pot, lid Inner surface of pot, lid |
| | Electric pressure pot for stew | | Inner surface of pot, lid Inner surface of pot, lid |

| Example of substrate | Preferred polymer* | Applying method | Other similar product |
|---|---|---|---|
| Metal | | | |
| Metal, glass | | | |
| Metal | | | |
| Metal, glass | I, II | Coating | |
| Metal | | | |
| Metal, glass | | | |
| Metal | | | |
| Metal, glass | | | |
| Metal | | | |
| Metal, glass | I, II | Coating | |
| Metal | | | |
| Metal, glass | | | |
| Metal | | | |
| Glass | | | Wok set for Chinese dishes, one-handed pot, double-handed pot |
| Metal | I, II | Coating | Gas fryer, electromagnetic fryer, Tempura fryer, oil filter unit |
| Glass | | | |
| Metal | | | |
| Glass | | | |
| Metal | | | Buckwheat boiling pot, rotary pot |
| Glass | I, II | Coating | |
| Metal | | | |
| Glass | I, II | Coating | |

*Fluorine-containing ethylenic polymer (A) having functional group of the present invention

TABLE 7

| Classification of product | Typical finished product | Similar product | Application |
|---|---|---|---|
| Other heating | Griddle | | Heating surface Lid |

TABLE 7-continued

| appliance for cooking | Electromagnetic cooking appliance | Electromagnetic range and oven | Cooking surface Cooking surface |
|---|---|---|---|
| | Electric cooking steamer | | Inner surface Inner surface of door |
| | | Food steamer for shop use | Inner surface Lid |
| | Noodle boiling apparatus for shop use | | Inner surface Lid |
| | Cooking roaster for shop use | | Inner surface Inner surface of door |
| | | Cooking roaster for shop use | Inner surface (metallic portion), pan for range |
| | Tablewares and cans washing machine for shop use | | Inner surface |
| | Heating cabinet for shop use | | Inner surface Inner surface of door |
| Garbage disposer | Garbage disposer | | Inner surface |
| | | Garbage disposer (wastes), garbage disposer for household use, garbage disposer for making compost | Inner surface Inner surface Inner surface |

| Example of substrate | Preferred polymer* | Applying method | Other similar product |
|---|---|---|---|
| Metal Metal, glass | I, II | Coating | Electric cooking griddle for fried dumpling stuffed with minced pork |
| Metal Metal | I, II | Coating | Electromagnetic range |
| Metal Metal Metal Metal, glass | I, II | Coating | Gas cooking steamer, electric cooking steamer |
| Metal Metal, glass | I, II | Coating | |
| Metal glass Metal | I, II | Coating | |
| Metal Metal, glass | I, II, III I, II, III | Coating Coating | Thawing box, food warmer, soup kettle, coffee maker, tea server, juice dispenser, miso soup dispenser, Sake warmer |
| Metal Metal Metal Metal, glass | I, II, III | Coating | |

*Fluorine-containing ethylenic polymer (A) having functional group of the present invention

EXAMPLE

Preparation Example 1

Preparation of Aqueous Dispersion Comprising PFA having Hydroxyl

A 3-liter glass-lined autoclave equipped with a stirrer, valve, pressure gauge and thermometer was charged with 1,500 ml of pure water and 9.0 g of ammonium perfluorooctanoate. After replacing with nitrogen gas sufficiently, the autoclave was evacuated and charged with 20 ml of ethane gas.

Then 3.8 g of perfluoro-(1,1,9,9-tetrahydro-2,5-bistrifluoromethyl-3,6-dioxa-8-nonenol) (formula (7)):

(7)

and 18 g of perfluoro(propyl vinyl ether) (PPVE) were fed into the autoclave with pressurized nitrogen, and a temperature inside the system was maintained at 70° C.

Pressurized tetrafluoroethylene (TFE) gas was introduced into the autoclave with stirring so that the inside pressure of the autoclave became 8.5 kgf/cm$^2$G.

Then a solution prepared by dissolving 0.15 g of ammonium persulfate in 5.0 g of water was added with pressurized nitrogen gas to initiate the reaction.

Since the pressure lowered with the advance of the polymerization reaction, it was increased again to 8.5 kgf/cm$^2$G by feeding tetrafluoroethylene gas at the time when it lowered to 7.5 kgf/cm$^2$G. Thus the decreasing and increasing of the pressure was repeated.

With continuing supply of tetrafluoroethylene, every time when about 40 g of tetrafluoroethylene gas was consumed after starting of the polymerization, 1.9 g of the above-mentioned fluorine-containing ethylenic monomer having hydroxyl (compound represented by the formula (7)) was introduced under pressure three times (5.7 g in total) to continue the polymerization. At the time when about 160 g of tetrafluoroethylene gas was consumed after starting of the polymerization, the supplying thereof was terminated and the autoclave was cooled and the un-reacted monomer was released to give 1,702 g of a bluish semi-transparent aqueous dispersion.

A concentration of the polymer in the obtained aqueous dispersion was 10.9%, and a particle size measured by dynamic light scattering method was 70.7 nm.

Also a part of the obtained aqueous dispersion was sampled and subjected to freeze coagulation, and the precipitated polymer was rinsed and dried to isolate a white solid. Components and their amounts of the obtained copolymer which were determined through $^{19}$F-NMR and IR analyses were TFE/PPVE/(Fluorine-containing ethylenic monomer having hydroxyl and represented by the formula (7))=97.7/1.2/1.1% by mole.

In infrared spectrum, characteristic absorption of —OH was observed at 3,620 to 3,400 cm$^{-1}$.

According to DSC analysis, Tm was 310° C., and according to DTGA analysis, 1% thermal decomposition temperature Td was 368° C. A melt flow rate measured under conditions of preheating at 372° C. for five minutes at a load of 7 kgf/cm$^2$ by using Koka-type flow tester and nozzles of 2 mm×8 mm length was 12.0 g/10 min.

Preparation Example 2
Preparation of Aqueous Dispersion Comprising PFA having Hydroxyl The same autoclave as in Preparation Example 1 was charged with 1,500 ml of pure water and 9.0 g of ammonium perfluorooctanoate. After replacing with nitrogen gas sufficiently, the autoclave was evacuated and charged with 20 ml of ethane gas.

Then 1.9 g of perfluoro-(1,1,9,9-tetrahydro-2,5-bistrifluoromethyl-3,6-dioxa-8-nonenol) (compound of the formula (7)) and 16.1 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure became 8.5 kgf/cm$^2$G.

Then a solution prepared by dissolving 0.15 g of ammonium persulfate in 5.0 g of water was fed with pressurized nitrogen gas to initiate the reaction.

Since the pressure lowered with the advance of the polymerization reaction, at the time when the pressure lowered down to 7.5 kgf/cm$^2$G, it was increased again to 8.5 kgf/cm$^2$G with tetrafluoroethylene gas, and the decreasing and increasing of the pressure were repeated.

With continuing supply of tetrafluoroethylene, every time when 40 g of tetrafluoroethylene gas was consumed after starting of the polymerization, 0.95 g of the fluorine-containing ethylenic monomer having hydroxyl (compound represented by the formula (7)) was introduced three times (2.85 g in total) under pressure to continue the polymerization. When 160 g of tetrafluoroethylene was consumed after starting of the polymerization, the supplying thereof was terminated. The autoclave was cooled and the un-reacted monomer was released to give 1,692 g of an aqueous dispersion. A concentration of the polymer in the obtained aqueous dispersion was 10.6% and a particle size thereof was 76.8 nm.

A part of the aqueous dispersion was sampled, and a white solid was isolated in the same manner as in Preparation Example 1.

Analysis of the obtained white solid indicates:

TFE/PPVE/(Fluorine-containing monomer having hydroxyl and represented by the formula (7))=98.3/1.1/0.6% by mole
Tm=310° C.
1% Thermal decomposition temperature Td=374° C.
Melt flow rate: 9.5 g/10 min In infrared spectrum, characteristic absorption of —OH was observed at 3,620 to 3,400 cm$^{-1}$.

Preparation Example 3
Synthesis of Aqueous Dispersion of PFA having No Functional Group Emulsion polymerization was carried out in the same manner as in Preparation Example 1 except that perfluoro-(1,1,9,9-tetrahydro-2,5-bistrifluoromethyl-3,6-dioxa-8-nonenol) (compound of the formula (7)) was not used, and 1,662 g of an aqueous dispersion of PFA having no functional group was obtained.

A concentration of the polymer in the aqueous dispersion was 9.7%, and a particle size thereof was 115 nm.

A white solid was isolated and analyzed in the same manner as in Preparation Example 1.

TFE/PPVE=98.9/1.1% by mole
Tm=310° C.
1% Thermal decomposition temperature Td=479° C.
Melt flow rate: 19.2 g/10 min In infrared spectrum, no characteristic absorption of —OH was observed.

Preparation Example 4
Synthesis of PFA having Hydroxyl

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 5.0 g of perfluoro-(1,1,9,9-tetrahydro-2,5-bistrifluoromethyl-3,6-dioxa-8-nonenol) (compound of the formula (7)), 130 g of perfluoro(propyl vinyl ether) (PPVE) and 180 g of methanol were fed into the autoclave with pressurized nitrogen gas, and a temperature inside the system was maintained at 35° C.

Pressurized tetrafluoroethylene (TFE) gas was introduced into the autoclave with stirring so that the inside pressure became 8.0 kgf/cm$^2$G. Then 0.5 g of a 50% methanol solution of di-n-propyl peroxydicarbonate was fed with pressurized nitrogen to initiate the reaction.

Since the pressure lowered with the advance of the polymerization reaction, at the time when the pressure lowered down to 7.5 kgf/cm$^2$G, it was increased again to 8.0 kgf/cm$^2$G, and the decreasing and increasing of the pressure were repeated.

With continuing supply of tetrafluoroethylene, every time when about 60 g of tetrafluoroethylene gas was consumed after starting of the polymerization, 2.5 g of the fluorine-containing ethylenic monomer having hydroxyl (compound represented by the formula (7)) was introduced nine times (22.5 g in total) under pressure to continue the polymerization. When about 600 g of tetrafluoroethylene was consumed after starting of the polymerization, the supplying thereof was terminated. The autoclave was cooled and the un-reacted monomer and R-114 were released.

The obtained copolymer was washed with water, rinsed with methanol and then vacuum-dried to give 710 g of a white solid. The composition of the obtained copolymer was TFE/PPVE/(Fluorine-containing ethylenic monomer having hydroxyl and represented by the formula (7))=97.0/2.0/1.0% by mole according to $^{19}$F-NMR and IR analyses. In infrared spectrum, characteristic absorption of —OH was observed at 3,620 to 3,400 cm$^{-1}$. According to DSC analysis, Tm was 305° C., and according to DTGA analysis, 1% thermal decomposition temperature Td was 375° C. A melt flow rate measured under conditions of preheating at 372° C. for five minutes at a load of 7 kgf/cm$^2$ by using Koka-type flow tester and nozzles of 2 mm diameter×8 mm length was 32 g/10 min.

Preparation Example 5
Synthesis of PFA having Hydroxyl

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then the reaction was initiated in the same manner as in Preparation Example 4 except that 2.5 g of perfluoro-(1,1,9,9-tetrahydro-2,5-bistrifluoromethyl-3,6-dioxa-8-nonenol), 132 g of perfluoro(propyl vinyl ether) (PPVE) and 230 g of methanol were used. A temperature inside the system was maintained at 35° C.

Pressurized tetrafluoroethylene (TFE) gas was introduced into the autoclave with stirring so that the inside pressure of the autoclave became 8.0 kgf/cm$^2$G. Then 0.5 g of a 50% methanol solution of di-n-propyl peroxydicarbonate was added with pressurized nitrogen to initiate the reaction.

Since the pressure lowered with the advance of the polymerization reaction, it was increased again to 8.0 kgf/cm$^2$G by feeding tetrafluoroethylene gas at the time when it lowered to 7.5 kgf/cm$^2$G. Thus the decreasing and increasing of the pressure was repeated.

Further 680 g of a white solid copolymer was obtained in the same manner as in Preparation Example 4 except that every time when about 60 g of tetrafluoroethylene gas was consumed after starting of the polymerization, 1.23 g of the above-mentioned fluorine-containing ethylenic monomer having hydroxyl (compound represented by the formula (7)) was introduced under pressure nine times (11.10 g in total). Components and their amounts of the obtained copolymer which were determined through $^{19}$F-NMR and IR analyses were TFE/PPVE/(Fluorine-containing ethylenic monomer having hydroxyl and represented by the formula (7))=97.6/2.0/0.4% by mole. In infrared spectrum, characteristic absorption of —OH was observed at 3,620 to 3,400 cm$^{-1}$. According to DSC analysis, Tm was 310° C., and according to DTGA analysis, a decomposition starting temperature was 368° C. and 1% thermal decomposition temperature Td was 375° C. A melt flow rate measured under conditions of preheating at 372° C. for five minutes at a load of 7 kgf/cm$^2$ by using Koka-type flow tester and nozzles of 2 mm diameter×8 mm length was 42 g/10 min.

Preparation Example 6
Synthesis of PFA having No Functional Group

Synthesis was carried out in the same manner as in Preparation Example 4 except that perfluoro-(1,1,9,9-tetrahydro-2,5-bistrifluoromethyl-3,6-dioxa-8-nonenol) (compound of the formula (7)) was not used and 240 g of methanol was used, and 597 g of PFA having no functional group was obtained.

The obtained PFA was analyzed in the same manner as in Preparation Example 4 and the results were as follows.

TFE/PPVE=98.2/1.8% by mole
Tm=310° C.
Td=469° C. (1% weight reduction)
Melt flow rate: 24 g/10 min Preparation Example 7
Preparation of PFA Powder Coating Composition having Hydroxyl The PFA powder having hydroxyl and prepared in Preparation Example 4 (apparent specific gravity: 0.5, true specific gravity: 2.1, average particle size: 600 μm) was compressed into a sheet of 60 mm wide×5 mm thick by a Roller Compactor (Model BCS-25 available from Shinto Kogyo Kabushiki Kaisha), and then crushed into about 10 mm diameter by a crusher and further finely pulverized at room temperature at 11,000 rpm by a pulverizer (Cosmomizer Model N-1 available from Nara Kikai Seisakusho). Subsequently the coarse powder particles of not less than 170 mesh (88 μm of sieve opening) were separated by a classifier (Hibolder Model 300SD available from Shi-Tokyo Kikai Kabushiki Kaisha) to give a PFA powder coating composition having hydroxyl. An apparent density of the powder was 0.7 g/ml, and an average particle size thereof was 20 μm.

Preparation Example 8
Preparation of PFA Powder Coating Composition having No Functional Group A PFA powder coating composition was prepared in the same manner as in Preparation Example 7 except that the PFA powder having no functional group and prepared in Preparation Example 6 (apparent specific gravity: 0.6, true specific gravity: 2.1, average particle size: 400 μm) was used instead of the PFA powder having hydroxyl and prepared in Preparation Example 4. An apparent density of the obtained powder was 0.73 g/ml, and an average particle size thereof was 20 μm.

Preparation Example 9
Synthesis of Fluorine-containing Polymer Prepared by Using a Non-fluorine-containing Monomer having Functional Group A 1-liter stainless steel autoclave equipped with a stirrer, valve, pressure gauge and thermometer was charged with 250 g of butyl acetate, 36.4 g of vinyl pivalate (VPi) and as a non-fluorine-containing monomer having hydroxyl, 32.5 g of 4-hydroxybutyl vinyl ether (HBVE) and 4.0 g of isopropoxycarbonyl peroxide. After cooling to 0° C. with ice and replacing with nitrogen gas sufficiently, the autoclave was evacuated and charged with 47.5 g of isobutylene (IB) and 142 g of tetrafluoroethylene (TFE).

The autoclave was heated to 40° C. and reaction was carried out for 30 hours with stirring. At the time when the inside pressure of the reaction vessel is lowered to not more than 2.0 kg/cm$^2$, the reaction was terminated. The autoclave was cooled and un-reacted gas monomer was released, and thus a butyl acetate solution of a fluorine-containing polymer was obtained. A polymer concentration was 45%.

A fluorine-containing polymer was separated from the obtained butyl acetate solution of fluorine-containing polymer through re-precipitation method, followed by sufficiently reducing pressure and drying, thus being separated in the form of white solid. According to $^1$H-NMR and $^{19}$F-NMR elementary analyses, the obtained fluorine-containing polymer was a copolymer of TFE/IB/VPi/HBVE=44/34/15/7% by mole.

Preparation Example 10
Production of Film of PFA having Hydroxyl

A metal die of 100 mm diameter was charged with 8.0 g of the white solid obtained in Preparation Example 4 and set on a press machine of 350° C., followed by preheating for 30 minutes and then compression-molding at 70 kg/cm$^2$ for one minute. Thus a 0.5 mm thick film was obtained.

Preparation Example 11
Production of Film of PFA having Hydroxyl

The same procedures as in Preparation Example 10 were repeated except that the white solid obtained in Preparation Example 5 was used, to give a 0.5 mm thick film.

Preparation Example 12
Production of Film of PFA having No Functional Group

The same procedures as in Preparation Example 10 were repeated except that the white solid obtained in Preparation Example 6 was used, to give a 0.5 mm thick film.

Preparation Example 13
Production of Film of PFA having Hydroxyl by Extrusion The white solid obtained in Preparation Example 4 was extruded at 350° to 370° C. by using a biaxial extruder (LABOPLASTOMIL available from Toyo Seiki Kabushiki Kaisha) to give pellets. The pellets were extruded at 360° to 380° C. at a roll temperature of 120° C. by using a uniaxial extruder (LABOPLASTOMIL available from Toyo Seiki Kabushiki Kaisha) to give a film of 10 cm wide×100 to 150 μm thick.

Preparation Example 14
Production of Film of PFA having No Functional Group by Extrusion The same procedures as in Preparation Example 13 were repeated except that the white solid obtained in Preparation Example 6 was used, to give pellets. Further extrusion was carried out in the same manner as in Preparation Example 17 to give a film of 10 cm wide×100 to 150 μm thick.

Preparation Example 15
Production of Laminated Film of PFA having Hydroxyl and PTFE The film of PFA having hydroxyl and obtained in Preparation Example 13 and a 0.5 mm thick PTFE film were overlapped and compression-molded in the same manner as in Preparation Example 10.

The two layers were adhered strongly.

Example 1
(1) Pre-treatment of Substrate

A 1.5 mm thick pure aluminum plate (A1050P) and a 1.5 mm thick SUS304 plate were degreased respectively with acetone.

(2) Formation of Primer Layer Comprising Fluorine-containing Polymer having Functional Group An aqueous dispersion comprising PFA having hydroxyl and prepared in Preparation Example 1 was applied to the plate by an air spray so that a coating thickness would become about 5 μm, followed by infrared-drying at 90° C. for 10 minutes and sintering at 380° C. for 20 minutes.

(3) Formation of Layer (Top Layer) Comprising Fluorine-containing Polymer having No Functional Group Onto the primer layer obtained in (2) above was applied an aqueous coating composition of PTFE (POLYFLON TFE Enamel EK4300CRN available from DAIKIN INDUSTRIES, LTD.) as a coating composition of fluorine-containing polymer having no functional group by an air spray so that a coating thickness would become about 20 μm, followed by infrared-drying at 90° C. for 10 minutes and sintering at 380° C. for 20 minutes.

(4) Evaluation of Adhesive Property

The method of evaluation is as follows.

Cross-cut Adhesion Test

According to JIS K 5400 1990, 8. 5. 2, a coated surface was cross-cut to give 100 squares, and an adhesive tape (available from Nichiban Kabushiki Kaisha) is adhered to the cross-cut surface sufficiently. Then immediately the tape is torn off. This is repeated 10 times with new adhesive tapes to check to see how many squares remain among 100 squares. The results are shown in Table 8.

Example 2

A coated plate was produced in the same manner as in Example 1 except that a primer layer was formed by using the aqueous dispersion comprising PFA having hydroxyl and obtained in Preparation Example 2 as a primer comprising a fluorine-containing polymer having functional group. The evaluation for adhesive property was carried out, and the results are shown in Table 8.

Comparative Example 1

A coated plate was produced in the same manner as in Example 1 except that a primer layer was formed by using the aqueous dispersion comprising PFA having no functional group and obtained in Preparation Example 3 instead of a primer comprising a fluorine-containing polymer having functional group. The evaluation for adhesive property was carried out, and the results are shown in Table 8.

Examples 3 and 4 and Comparative Example 2

Coated plates were produced in the same manner as in Example 1 in case of Example 3, in Example 2 in case of Example 4 and in Comparative Example 1 in case of Comparative Example 2 except that a top layer was formed by using an aqueous coating composition comprising FEP (NEOFLON FEP Dispersion ND-1 available from DAIKIN INDUSTRIES, LTD) as a coating composition comprising a fluorine-containing polymer having no functional group. The evaluation for adhesive property was carried out, and the results are shown in Table 8.

Example 5

(1) Pre-treatment of Substrate

Pre-treatment was carried out in the same manner as in Example 1.

(2) Formation of Primer Layer Comprising Fluorine-containing Polymer having Functional Group An aqueous dispersion comprising PFA having hydroxyl and prepared in Preparation Example 1 was applied to the plate by an air spray so that a coating thickness would become about 5 μm, followed by infrared-drying at 90° C. for 10 minutes.

(3) Formation of Layer (Top Layer) Comprising Fluorine-containing Polymer having No Functional Group Onto the primer layer obtained in (2) above was applied a powder coating composition of PFA (NEOFLON PFA Powder Coating Composition ACX-31 available from DAIKIN INDUSTRIES, LTD.) as a coating composition of fluorine-containing polymer having no functional group by electrostatic coating so that a coating thickness would become 40 μm, followed by sintering at 380° C. for 20 minutes.

(4) Evaluation of Adhesive Property

The evaluation was carried out in the same manner as in Example 1, and the results are shown in Table 8.

Example 6

A coated plate was produced in the same manner as in Example 5 except that a primer layer was formed by using the aqueous dispersion comprising PFA having hydroxyl and obtained in Preparation Example 2 as a primer comprising a fluorine-containing polymer having functional group. The evaluation for adhesive property was carried out, and the results are shown in Table 8.

Comparative Example 3

A coated plate was produced in the same manner as in Example 5 except that a primer layer was formed by using the aqueous dispersion comprising PFA having no functional group and obtained in Preparation Example 3 instead of a primer comprising a fluorine-containing polymer having functional group. The evaluation for adhesive property was carried out, and the results are shown in Table 8.

Example 7

Evaluation of Adhesive Property of PFA Powder Coating Composition having Hydroxyl (1) Production of Press Sheet for Adhesion Test About 4 kg of the powder coating composition having hydroxyl and prepared in Preparation Example 7 was put in a cylindrical metal mold of 60 mm diameter and compression-molded at room temperature at a pressure of 300 kgf/cm$^2$ with a press machine to give a disc-like cold press sheet (hereinafter also referred to as "PFA sheet").

(2) Pre-treatment of Substrate

A pure aluminum plate of 100×100×1 (mm) was degreased with acetone and then subjected to sand blasting.

(3) Production of Adhered Sample

The PFA sheet obtained in (1) above was placed on the aluminum plate ((2) above) and put in a hot air dryer to heat and melt at 330° C. for 10 minutes. Thus a sample produced by adhering the PFA sheet of about 450 μm thick to the aluminum plate was obtained. FIG. 1 shows a diagrammatic plan view of the adhered plate comprising the PFA sheet 1 and the aluminum plate 2.

(4) Measurement of Adhesive Strength

Figure 2:
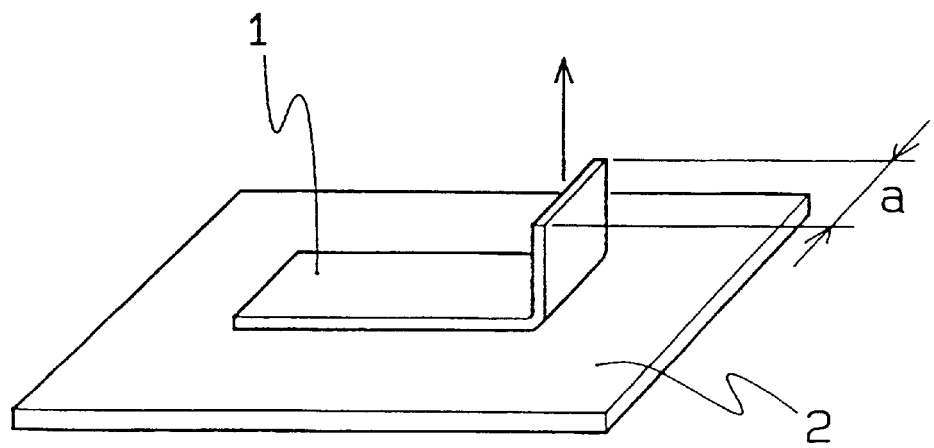
FIG. 2 is a diagrammatic perspective view of a test sample used to measure adhesive strength in Example 7 of the present invention.

As shown in FIG. 1, the PFA sheet 1 of the adhered sample obtained in (3) above was cut with a cutter at intervals of a width a (10 mm) and one end of strip-like sheet 1 was folded up, thus giving a test sample for measuring adhesive strength. FIG. 2 shows a diagrammatic perspective view of the test sample for measuring adhesive strength. As shown in FIG. 2, the sheet 1 was pulled up at an angle of 90° to the aluminum plate 2 to measure adhesive strength. The adhesive strength was measured at room temperature at a cross head speed of 50 mm/min with TENSILON Universal Tester (available from Orientec Corporation). An adhesive strength was 5.5 kgf/cm as an average value of peel by area method.

Comparative Example 4

Evaluation of Adhesive Property of PFA Powder Coating Composition having No Functional Group Production of a press sheet for adhesion test, pre-treatment of a substrate and production of an adhered sample were carried out in the same manner as in Example 7 except that the powder coating composition of PFA having no functional group and prepared in Preparation Example 8 was used instead of the powder coating composition of PFA having hydroxyl and prepared in Preparation Example 7. Then adhesive strength was measured.

Adhesive strength of the powder coating composition of PFA having no functional group was 0.8 kgf/cm.

Example 8

Electrostatic Coating of PFA Powder Coating Composition having Hydroxyl

Electrostatic coating of the PFA powder coating composition having hydroxyl and prepared in Preparation Example 7 was carried out on an aluminum plate pre-treated in the same manner as in Example 7 at room temperature at a voltage of 40 kV with an electrostatic coating machine (Model GX3300 available from Iwata Toso Kabushiki Kaisha). The coated plate was sintered at 330° C. for 15 minutes with a hot air dryer to give a coating film.

The coating film was a continuous uniform transparent film and was adhered strongly to the aluminum plate.

Comparative Example 5

Heat Resistance of Fluorine-containing Polymer Prepared by Using Non-fluorine-containing Monomer having Functional Group Thermal decomposition temperature of the fluorine-containing polymer prepared in Preparation Example 9 was measured through TGA analysis, and 1% thermal decomposition temperature was 220° C. Thereby it is seen that heat resistance of the fluorine-containing polymer prepared by using a non-fluorine-containing monomer having functional group like the polymer obtained in Preparation Example 9 is low.

Further the fluorine-containing copolymer obtained in Preparation Example 9 was dissolved in butyl acetate in a concentration of 10% by weight.

Pre-treatment of a pure aluminum substrate, application of a primer layer comprising the fluorine-containing copolymer of Preparation Example 9 and application (electrostatic coating of PFA powder coating composition) of a top layer were carried out in the same manner as in Example 5 except that for the primer layer, a butyl acetate solution of the fluorine-containing copolymer of Preparation Example 9 was used instead of the aqueous dispersion of PFA having hydroxyl.

A coating film obtained by sintering at 380° C. for 20 minutes after the application was colored yellow-brown, and foaming and peeling were also seen. Thus a uniform transparent coating film could not be obtained.

TABLE 8

|  | Ex. 1 | Ex. 2 | Com. Ex. 1 | Ex. 3 | Ex. 4 | Com. Ex. 2 | Ex. 5 | Ex. 6 | Com. Ex. 3 |
|---|---|---|---|---|---|---|---|---|---|
| Fluorine-containing aqueous dispersion used for primer layer | Prep. Ex. 1 | Prep. Ex. 2 | Prep. Ex. 3 | Prep. Ex. 1 | Prep. Ex. 2 | Prep. Ex. 3 | Prep. Ex. 1 | Prep. Ex. 2 | Prep. Ex. 3 |
| Fluorine-containing resin forming top layer Evaluation of adhesion (Cross-out adhesion test) | PTFE | PTFE | PTFE | FEP | FEP | FEP | PFA | PFA | PFA |
| SUS304 | 100/100 | 100/100 | 0/100 | 100/100 | 100/100 | 0/100 | 100/100 | 100/100 | 20/100 |
| Pure aluminum | 100/100 | 100/100 | 0/100 | 100/100 | 100/100 | 20/100 | 100/100 | 100/100 | 30/100 |

Examples 9 to 12

Adhesion Test of PFA Film having Hydroxyl to Metal

Adhesion test of a PFA film having hydroxyl (Film of Preparation Example 10 or 11) to a metal plate was carried out in the manner mentioned below by using degreased chromate-treated aluminum, pure aluminum and steel plates of 0.5 mm thick. The results are shown in Table 9.

Production of Test Piece for Peeling Test

Figure 3:
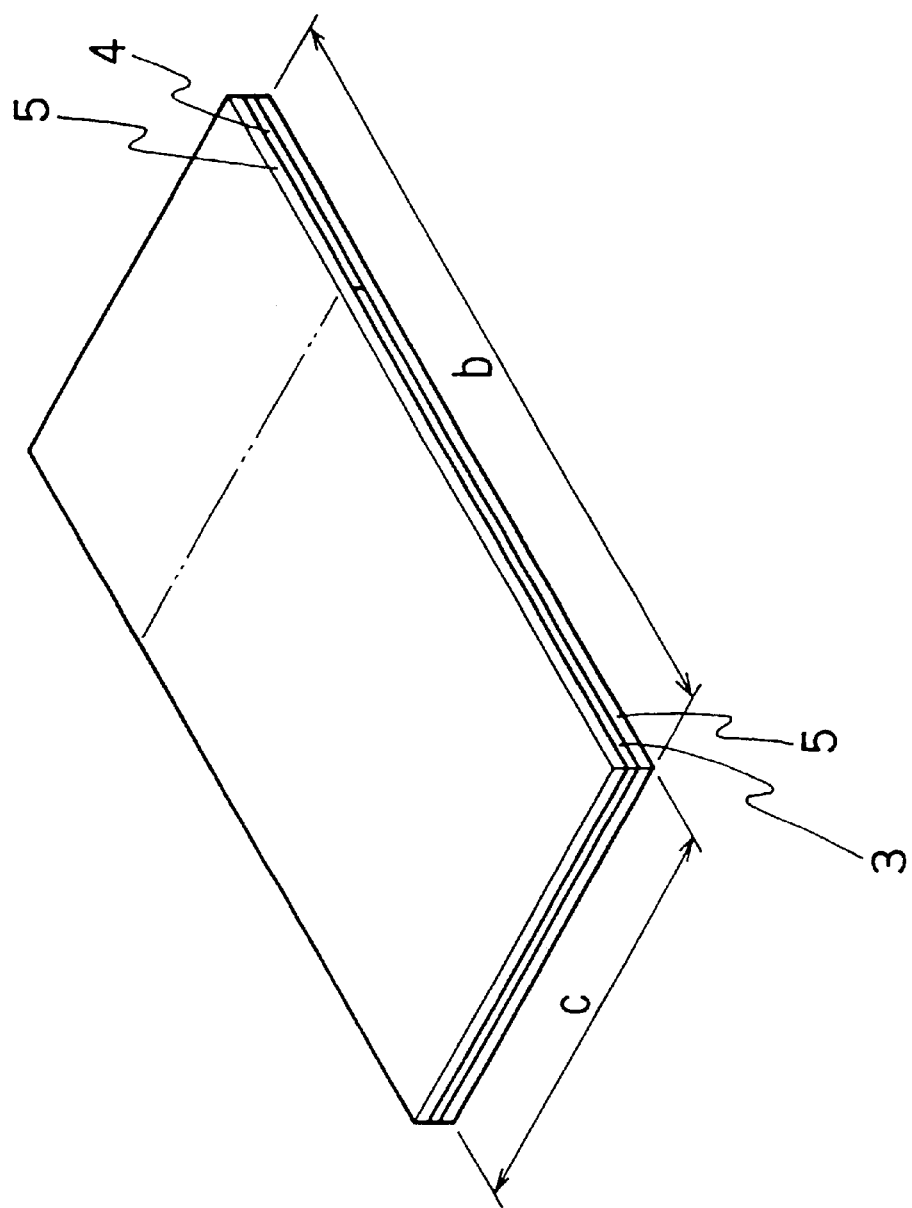
FIG. 3 is a diagrammatic perspective view of a laminated article made to produce a test piece to be subjected to adhesion test (T-type peeling test) in the present invention.

FIG. 3 is a diagrammatic perspective view of a laminated article made to produce a test piece for peeling test. As shown in FIG. 3, the PFA film having hydroxyl and obtained in Preparation Examples 10 or 11 as an adhesive layer 3 and a 0.1 mm thick spacer 4 (aluminum foil) were put between the two metal plates 5 and then set on a press machine of 350° C., followed by preheating (20 minutes) and then compressing at 50 kg/cm² for one minute to give a laminated article of length b (150 mm)×width c (70 mm).

Figure 4:
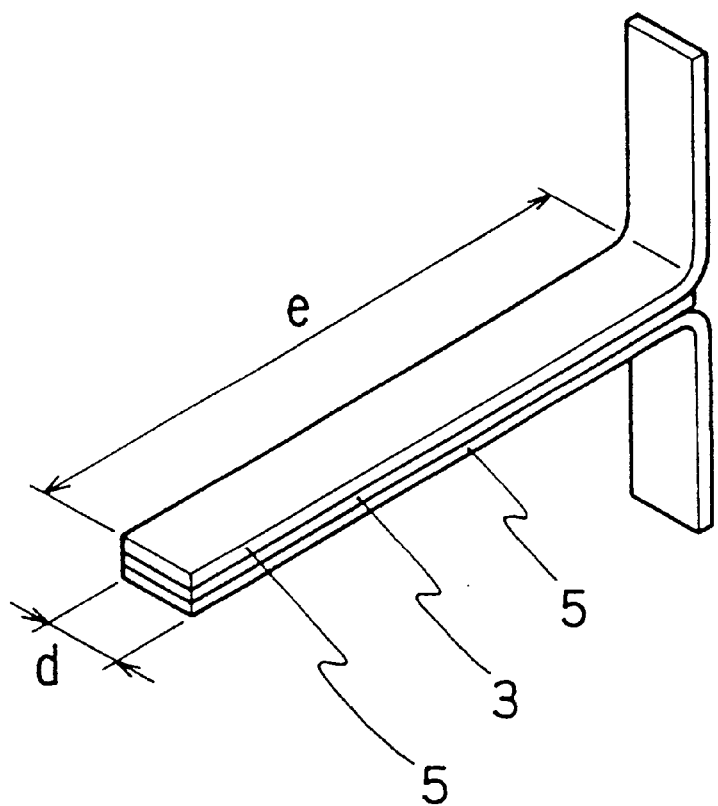
FIG. 4 is a diagrammatic perspective view of a test piece to be subjected to adhesion test (T-type peeling test) in the present invention.

A thickness of the respective adhesive layers 3 of the obtained laminated articles was 0.1 mm. Further the laminated article was cut to a width d of 25 mm and the spacer portion is bent in the shape of T at a point apart by a distance e (100 mm) from one end of the laminated article to give a test piece for the peeling test. FIG. 4 is a diagrammatic perspective view of the obtained test piece for peeling test. In FIG. 4, numeral 3 represents an adhesive layer and numeral represents metal plates.

Peeling Test

The peeling test was carried out at room temperature at a cross head speed of 50 mm/min by using TENSILON Universal Tester available from Orientec Corporation according to T-type peeling test method of JIS K6854-1977. The results show the maximum peeling strength (kgf/25 mm) and minimum peeling strength (kgf/25 mm)

Comparative Examples 6 to 8

Adhesion Test of PFA Film having No Functional Group to Metal

Production of test pieces and peeling test were carried out in the same manner as in Example 9 except that the PFA films having no functional group and obtained in Preparation Example 12 were used instead of the PFA films having hydroxyl and obtained in Preparation Example 10 or 11. The results are shown in Table 9.

Examples 13 and 14

Adhesion Test of Film of PFA having Hydroxyl to Glass

Adhesion test of PFA having hydroxyl to Pyrex glass plate of 30×20×5 mm was carried out in the manner mentioned below.

Further hot water resistance test and methanol dipping test of the laminated article after the adhesion were carried out. The results are shown in Table 10.

Production of Test Piece for Tensile Shear Test

Figure 5:
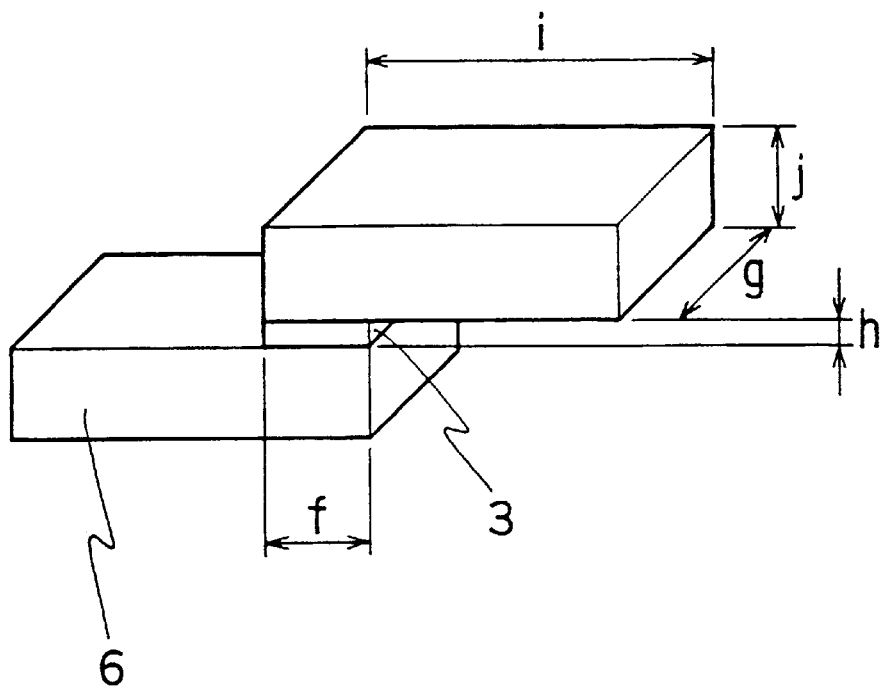
FIG. 5 is a diagrammatic perspective view of a test piece to be subjected to adhesion test (tensile shear strength test) in the present invention.

FIG. 5 is a diagrammatic perspective view of a test piece for tensile shear test. As shown in Table 5, the PFA film having hydroxyl as an adhesive layer 3 which was obtained in Preparation Example 10 or 11 (length f of 10 m, width g of 20 mm, thickness h of 0.1 mm) was put between the Pyrex glass sheets 6 (length i of 30 m, width g of 20 mm, thickness j of 5 mm), and a load of 3 kg was applied, followed by allowing to stand at 350° C. for 30 minutes in an electric oven to give a test piece. A thickness of the adhesive layer 3 was adjusted to 0.1 mm with a spacer.

Adhesive Strength

Figure 6:
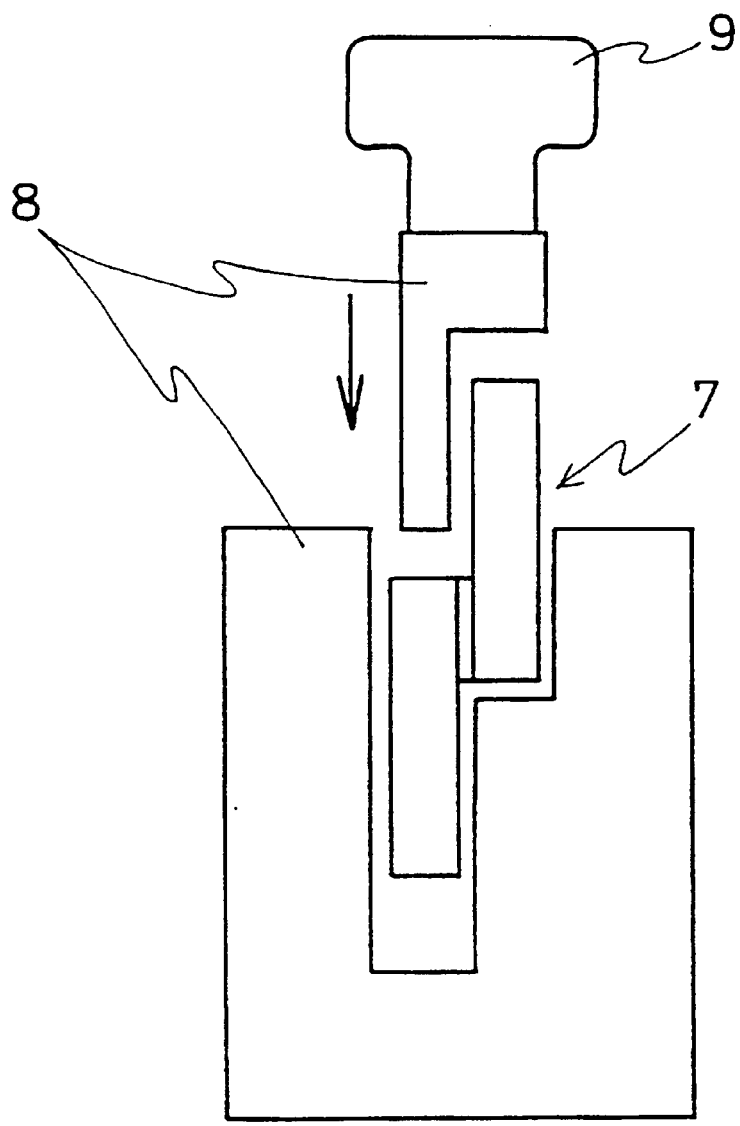
FIG. 6 is a diagrammatic view of a test device to be used for adhesion test (tensile shear strength test) in the present invention.

FIG. 6 is a diagrammatic perspective view of a test device to be used for measuring adhesive strength by tensile shearing method. As shown in FIG. 6, the test piece 7 obtained as mentioned above and test jigs 8 matching the shape of the test piece were set on TENSILON Universal Tester 9 available from Orientec Corporation, and then the tensile shearing test was carried out at a cross head speed of 20 mm/min. The results of the measurement are shown by maximum adhesive strength (kgf/cm²).

Hot Water Resistance Test

The test piece obtained as mentioned above was dipped in 50° C. hot water to check to see adhesion after a lapse of 6 hours and measure adhesive strength (kgf/cm²) after a lapse of 72 hours.

Methanol Dipping Test

The test piece obtained as mentioned above was dipped in methanol of room temperature to check to see adhesion.

Comparative Example 9

Adhesion of Film of PFA having No Functional Group to Glass

Production of a test piece and various tests were carried out in the same manner as in Example 13 except that the PFA film having no functional group and obtained in Preparation Example 12 was used instead of the PFA film having hydroxyl and obtained in Preparation Example 10 or 11. The results are shown in Table 10.

Example 15

Tests for Adhesion and Post-processability after Lamination of PFA Film having Hydroxyl to Stainless Steel A laminated test plate was produced in the manner mentioned below by using a degreased SUS304 stainless steel plate of 150 mm long×70 mm wide×0.5 mm thick as a metal plate. The PFA film having hydroxyl and produced in Preparation Example 13 and the PFA film having no functional group and produced in Preparation Example 14 were cut to the same size as the above-mentioned SUS plate.

Further a polyimide film (Kapton 200-H available from E.I. Du Pont) which was used as a film for separation was cut to the same size as above.

Figure 7:
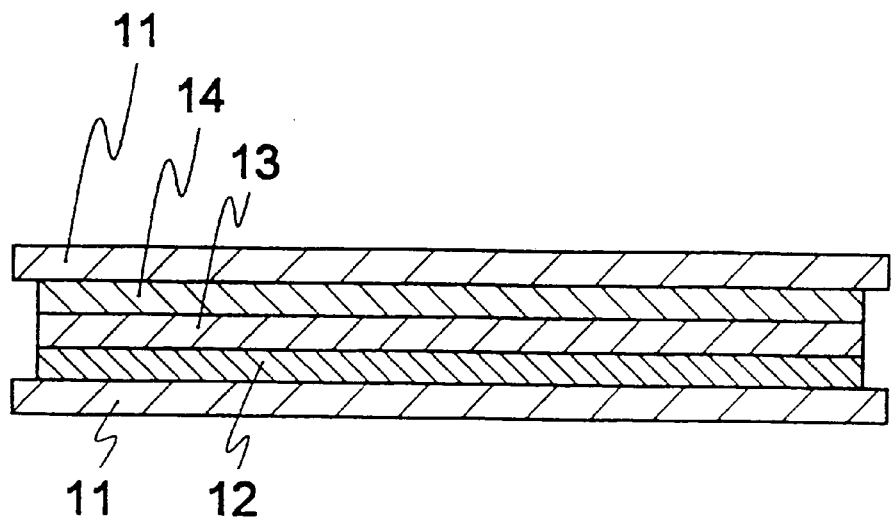
FIG. 7 is a diagrammatic cross-sectional view of a laminated test plate made in Example 15 of the present invention.

FIG. 7 is a diagrammatic cross-sectional view of a laminated test plate. As shown in FIG. 7, the PFA film 12 having hydroxyl, the PFA film 13 having no functional group and the polyimide film 14 were put between the two SUS plates 11, and then set on a press machine preset at 350° C., followed by preheating (20 minutes) and then pressing at 50 kg/cm² for one minute to give a laminated test plate.

After cooling, when the SUS plate 11 contacting the polyimide film 14 was removed, the polyimide film was peeled from the interface with the PFA film 13 having no functional group spontaneously.

Figure 8:
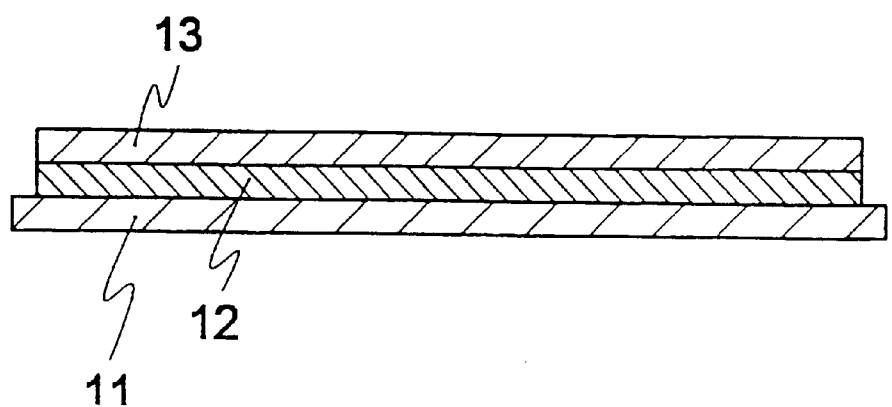
FIG. 8 is a diagrammatic cross-sectional view of a three-layered laminated article made in Example 15 of the present invention.

As a result, a three-layered laminated article having good transparency and comprising the PFA film 12 having hydroxyl as an adhesive layer, the SUS plate 11 and the PFA film 13 having no functional group was obtained. FIG. 8 is a diagrammatic cross-sectional view of the obtained three-layered laminated article.

Further the surface film of the obtained three-layered laminated article was cross-cut with a cutting knife so that a cut depth reached to the surface of the SUS plate 11, and a hundred pieces of 1 mm squares of lattice pattern was made. A center of the square was pushed out by 5 mm with Erichsen tester. As a result, the PFA film 12 having hydroxyl was not peeled off at all and kept adhered strongly to the SUS plate 11 which was a substrate.

The PFA film 12 exhibited strong adhesion to the SUS plate 11.

Comparative Example 10

Figure 9:
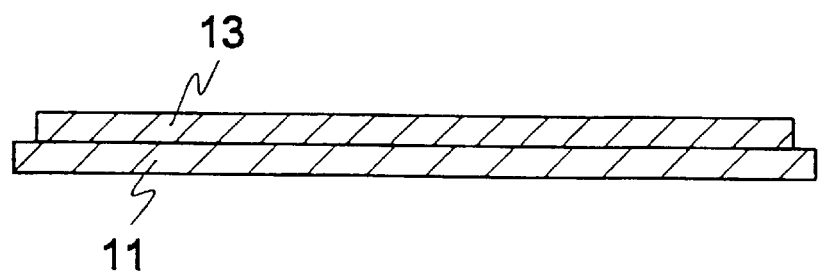
FIG. 9 is a diagrammatic cross-sectional view of a laminated article made in Comparative Example 10 of the present invention.

Tests for Adhesion and Post-Processability after Lamination of PFA Film having No Functional Group to Stainless Steel A laminated article comprising the SUS plate 11 and the PFA film 13 having no functional group was produced in the same manner as in Example 15 except that the PFA film having hydroxyl was not used. FIG. 9 is a diagrammatic cross-sectional view of the obtained laminated article.

The film seemed to be adhered, but the PFA film 13 having no functional group could be peeled off from the SUS sheet 11 easily.

Further Erichsen test was carried out in the same manner as in Example 15, and 60 pieces among 100 cross-cut squares were peeled off from the cut line.

Example 16

Adhesion Test of PFA Film having Hydroxyl and Polyimide Film

Figure 10:
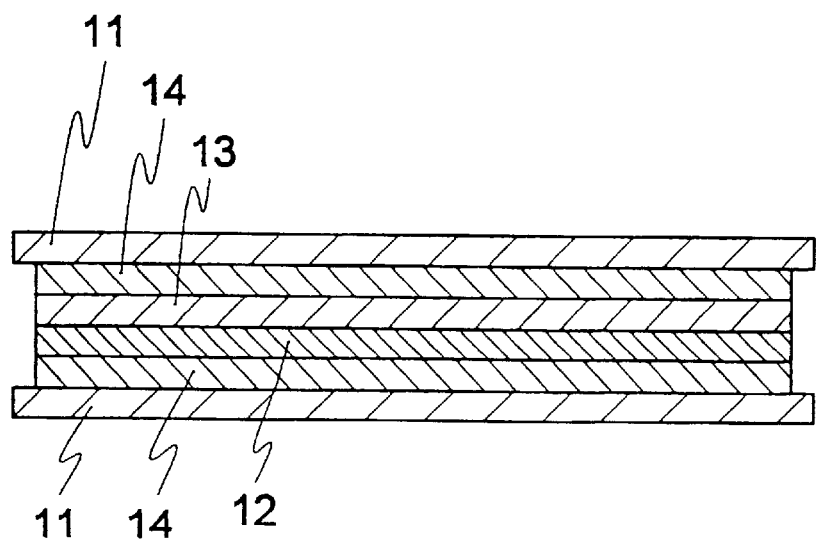
FIG. 10 is a diagrammatic cross-sectional view of a laminated test plate for making a laminated article in Example 16 of the present invention.
Figure 11:
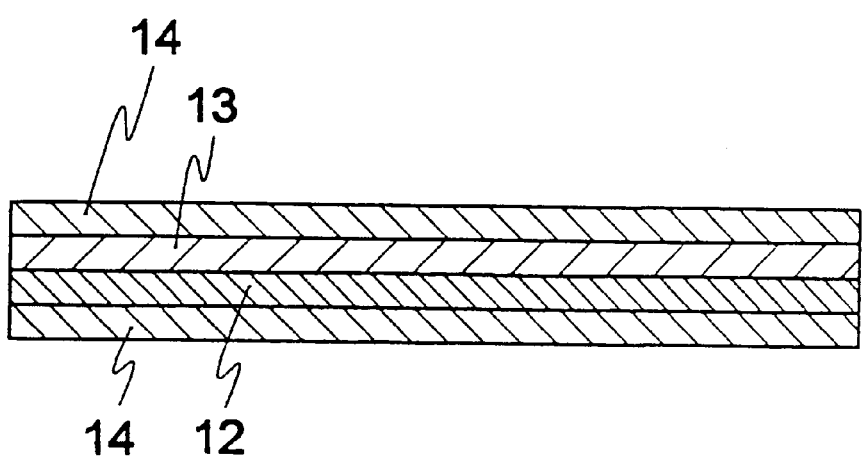
FIG. 11 is a diagrammatic cross-sectional view of a laminated article made in Example 16 of the present invention.

The PFA film 12 having hydroxyl and obtained in Preparation Example 13, the PFA film 13 having no functional group and obtained in Preparation Example 14 and the polyimide film 14 were cut to the same size as in Example 15, and put between the two SUS plates 11, followed by heating with a press machine in the same manner as in Example 15 to give a laminated test plate. FIG. 10 shows a diagrammatic cross-sectional view of the obtained laminated test plate. Then after cooling, the SUS plate 11 was removed to obtain a laminated article. FIG. 11 is a diagrammatic cross-sectional view of the obtained laminated article. Further the laminated article was cut to a width of 25 mm.

Figure 12:
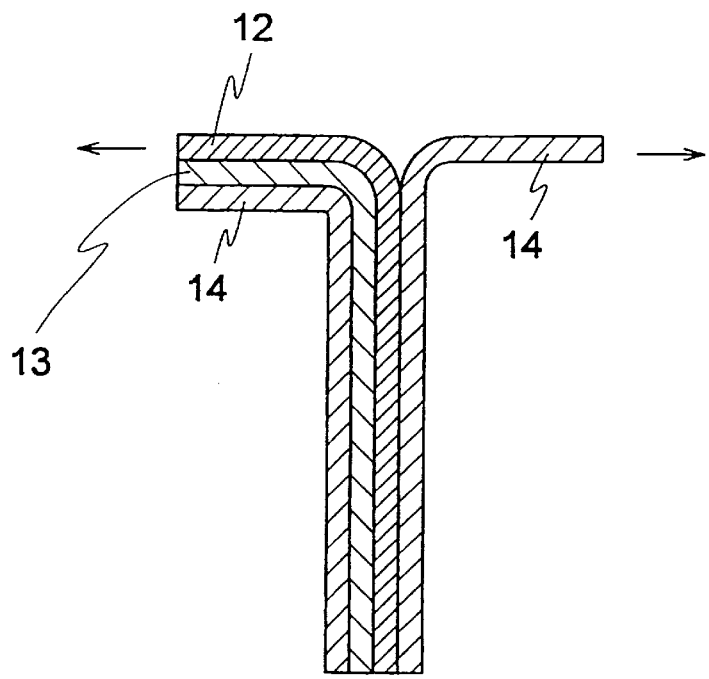
FIG. 12 is a diagrammatic cross-sectional view of a laminated article to be subjected to T-type peeling test in Example 16 of the present invention.

Subsequently FIG. 12 is a diagrammatic cross-sectional view of the above-mentioned laminated article to be subjected to T-type peeling test. In FIG. 12, a part of interface between the polyimide film 14 and the PFA film 12 having hydroxyl was peeled, and the T-type peeling test by peeling in the direction of an arrow shown in FIG. 12 was carried out in the same manner as in Example 1. The adhesive strength was 4.0 kgf/25 mm as an average value of peel according to area method.

Comparative Example 11

Adhesion Test of PFA Film having No Functional Group and Polyimide Film

Figure 13:
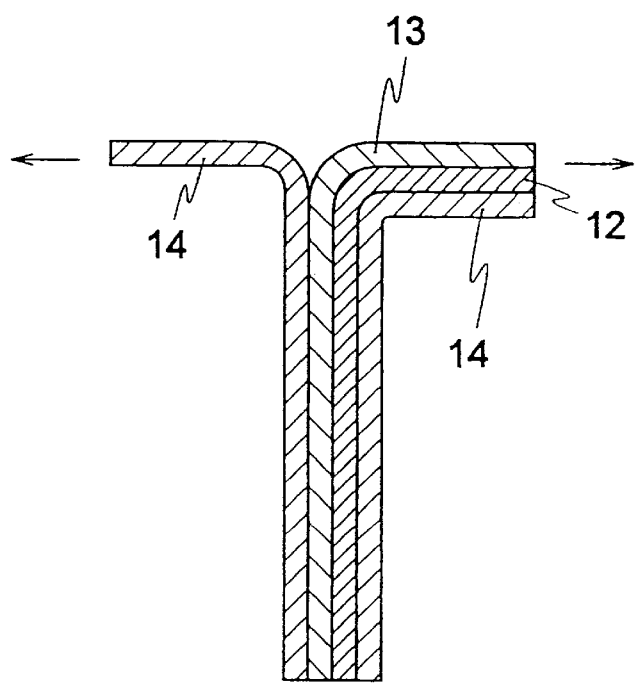
FIG. 13 is a diagrammatic cross-sectional view of a laminated article to be subjected to T-type peeling test in Comparative Example 10 of the present invention.

FIG. 13 is a diagrammatic cross-sectional view of a laminated article to be subjected to T-type peeling test in the same manner as in Example 1. In FIG. 13, a part of interface between the polyimide film 14 and the PFA film 13 having no functional group of the 25 mm wide laminated article obtained in Example 16 was peeled, and the T-type peeling test by peeling in the direction of an arrow shown in FIG. 13 was carried out in the same manner as in Example 16, but no adhesive property was exhibited.

Comparative Example 12

Heat Resistance of Fluorine-containing Polymer Prepared by Using Non-fluorine-containing Monomer having Functional Group A thermal decomposition temperature of the fluorine-containing polymer obtained in Preparation Example 9 was measured through TGA analysis, and 1% thermal decomposition temperature was 220° C. From that, it is seen that the fluorine-containing polymer as prepared in Preparation Example 9 by using a non-fluorine-containing monomer having functional group has low heat resistance.

Further the fluorine-containing polymer prepared in Preparation Example 9 was dissolved in butyl acetate in a concentration of 10% by weight.

To the aluminum plate pre-treated in the same manner as in Example 9 was applied the butyl acetate solution of fluorine-containing polymer of Preparation Example 9 by an air spray so that a coating thickness would become about 10 μm, followed by infrared-drying at 90° C. for 10 minutes.

Figure 14:
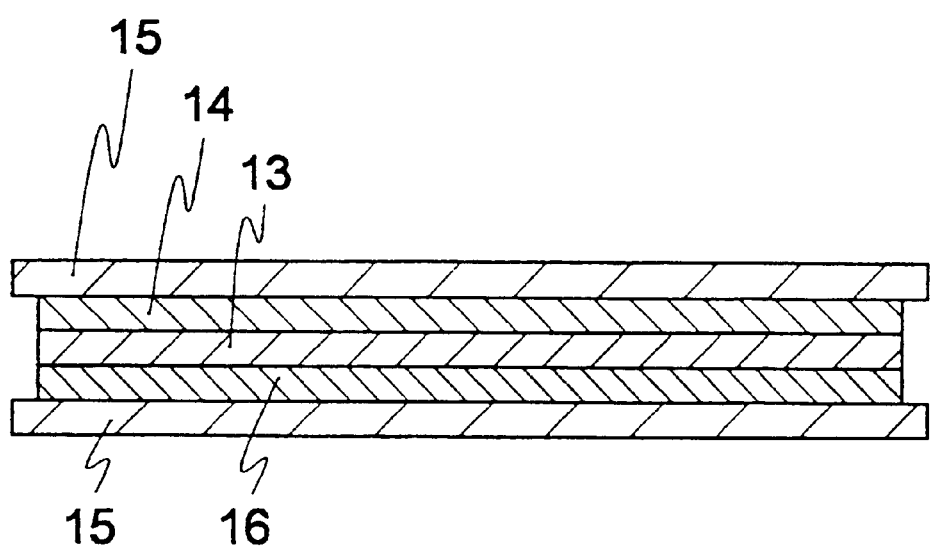
FIG. 14 is a diagrammatic cross-sectional view of a laminated test plate made in Comparative Example 12 of the present invention.

On the coating film 16 of the fluorine-containing polymer prepared by using a non-fluorine-containing monomer having functional group were placed in order the PFA film 13 having no functional group and prepared in Preparation Example 14, the polyimide film 14 for separation (same as in Example 15) and the aluminum plate 15, followed by heating and pressing at 350° C. with a press machine in the same manner as in Example 15 to give a laminated test plate. A diagrammatic cross-sectional view of the obtained laminated test plate is shown in FIG. 14.

After cooling the laminated test plate, the aluminum plate 15 contacting the polyimide film 14 and the polyimide film 14 were removed to give a laminated article.

The obtained laminated article was colored yellow-brown, and foaming and peeling occurred between the PFA film 13 and the aluminum plate 15. Thus a uniform transparent laminated article could not be obtained.

TABLE 9

|  | Ex. 9 | Ex. 10 | Com. Ex. 6 | Ex. 11 | Com. Ex. 7 | Ex. 12 | Com. Ex. 8 |
|---|---|---|---|---|---|---|---|
| Kind of fluorine-containing adhesive | Prep. Ex. 10 | Prep. Ex. 11 | Prep. Ex. 12 | Prep. Ex. 10 | Prep. Ex. 12 | Prep. Ex. 10 | Prep. Ex. 12 |
| Kind of metal plate | Chromate-treated aluminum | Chromate-treated aluminum | Chromate-treated aluminum | Pure aluminum | Pure aluminum | Dull-finished steel sheet | Dull-finished steel sheet |
| Maximum peeling strength (kgf/25 mm) | 15.4 | 11.3 | 1.8 | 9.5 | 1.5 | 22.4 | 2.0 |
| Minimum peeling strength (kgf/25 mm) | 7.2 | 2.1 | 0.18 | 2.5 | 0.15 | 12.4 | 0.20 |

TABLE 10

|  | Ex. 13 | Ex. 14 | Com. Ex. 9 |
|---|---|---|---|
| Kind of fluorine-containing adhesive | Prep. Ex. 10 | Prep. Ex. 11 | Prep. Ex. 12 |
| Kind of substrate | Pyrex glass | Pyrex glass | Pyrex glass |
| Adhesive strength (kgf/cm$^2$) | 83 or more | 83 or more | 59 |
|  | Breaking of glass | Breaking of glass | Peeling |
| Hot water resistance (50° C.) 6 hours after | Adhesion was maintained, | Adhesion was maintained. | Spontaneous peeing |
| Adhesive strength (kgf/cm$^2$) 72 hours after | 63 | 10 | — |
| Methanol dip test (room temperature) 24 hours | Adhesion was maintained. | — | Spontaneous peeing |
| 72 hours | Adhesion was maintained. | — | — |

Examples 17 and 18

Non-stickiness test was carried out through the method mentioned below by using, as a test plate, the plate electrostatically coated with the PFA powder coating composition having hydroxyl of Example 8 (Example 17) and the extruded film of PFA having hydroxyl of Preparation Example 13 (Example 18). The results are shown in Table 11.

Non-stickiness Test

Figure 15:
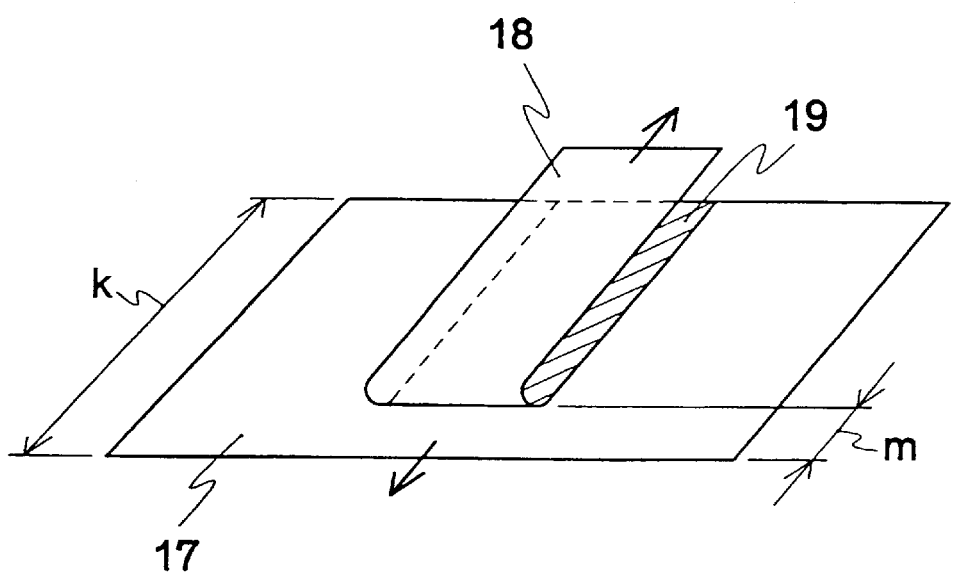
FIG. 15 is a diagrammatic perspective view of a test piece to be subjected to non-stickiness test in Example of the present invention.

Measurement was made at 23° C.±2° C. FIG. 15 is a diagrammatic perspective view of a test piece used for non-stickiness test. The test plate 17 has a length of not less than 150 mm and stains on the surface thereof was wiped off with acetone. First, a 18 mm wide adhesive tape 18 (JIS Z 1522) was cut to a length of 300 mm and only a 150 mm long portion k was put on the test plate 17. Then the tape 18 was scrubbed for bonding by using an eraser of JIS S 6050 to obtain an adhered portion 19. To the remaining 150 mm long portion is adhered a paper (not illustrated) to make handling of the tape easy. After the bonding, the tape was allowed to stand for about 20 minutes so that the tape 18 was fitted more to the test plate 17. The tape 18 was peeled up to a width m of 25 mm from the end of the test plate 17, and the test plate 17 was mounted on a lower chuck device of a tension tester. The end of the peeled tape 18 was folded by 180 degree, and was fitted to an upper chuck device so that the tape 18 was peeled straight. A force which peeled the tape 18 from the test plate 17 with the tester was measured at a stretching speed of 20 mm/minute. The force was an average of the values measured when the tape 18 was peeled smooth. The results are shown in Table 11.

Comparative Examples 15 and 16

Non-stickiness Test of Film of PFA having No Functional Group

Non-stickiness test was carried out in the same manner as in Example 17 by using an extruded film of PFA having no functional group and obtained in Preparation Example 14 (Comparative Example 15) and non-coated glass plate (Comparative Example 16). The results are shown in Table 11.

TABLE 11

|  | Ex. 17 Ex. 8 | Ex. 18 Prep. Ex. 13 | Com. Ex. 15 Prep. Ex. 14 | Com. Ex. 16 — |
|---|---|---|---|---|
| Test sample | Plate coated with PFA powder coating composition having hydroxyl | PFA film having hydroxyl | PFA film having no functional group | Glass plate |
| Non-sticking property (gf/18 mm) | 240 | 235 | 230 | 300 |

From Table 11, it was seen that PFA having OH group also has the same excellent non-sticking property as PFA having no functional group.

Example 19

Heat Resistance of Adhesion of Plate Coated with PFA Powder Coating Composition having Hydroxyl (1) Production of Plate Coated with a Powder Coating Composition An aluminum plate pre-treated in the same manner as in Example 7 was coated with a powder coating composition of PFA having hydroxyl and prepared in Preparation Example 7 at room temperature at a voltage of 40 kV by electrostatic coating by using an electrostatic powder coating machine (the same machine as in Example 8). The coated aluminum plate was sintered at 330° C. for 15 minutes to give a coating film. On the obtained coating film was applied a powder coating composition of PFA having no functional group (NEOFLON PFA Powder Coating Composition ACX-31 available from DAIKIN INDUSTRIES, LTD) by electrostatic coating in the same manner as above, followed by sintering at 380° C. for 20 minutes to give a transparent coating film having a total thickness of 159 μm.

(2) Measurement of Adhesive Strength

Figure 16:
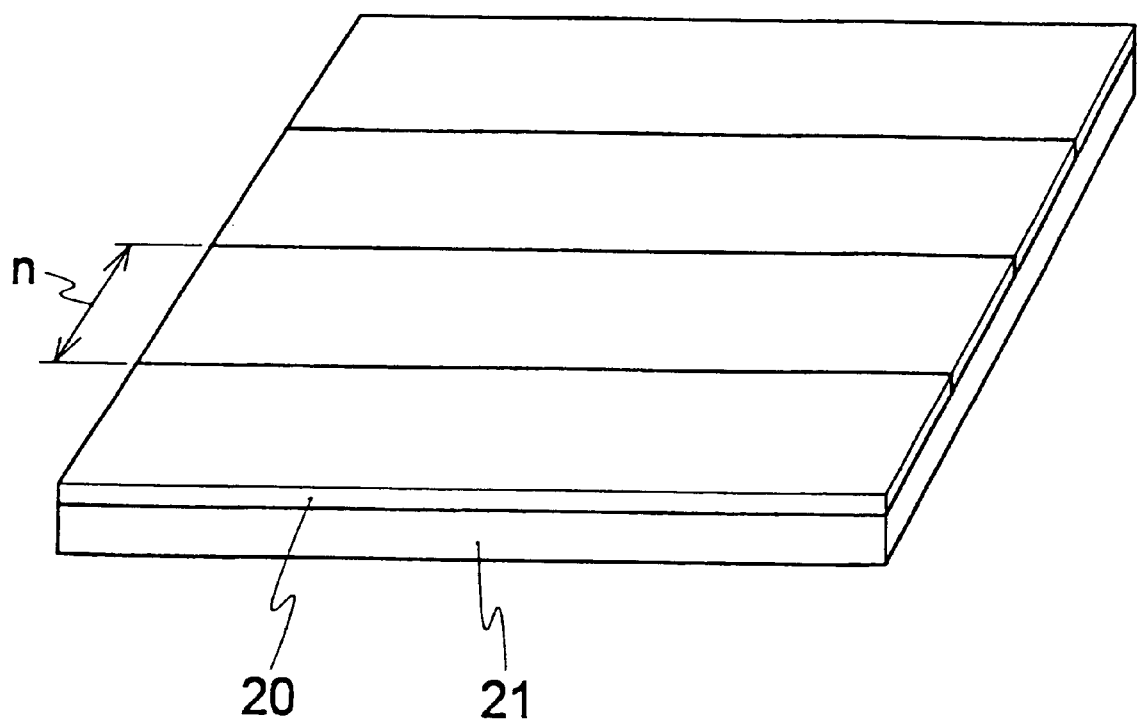
FIG. 16 is a diagrammatic perspective view of an aluminum plate having a coating film and obtained in (1) of Example 19 of the present invention.
Figure 17:
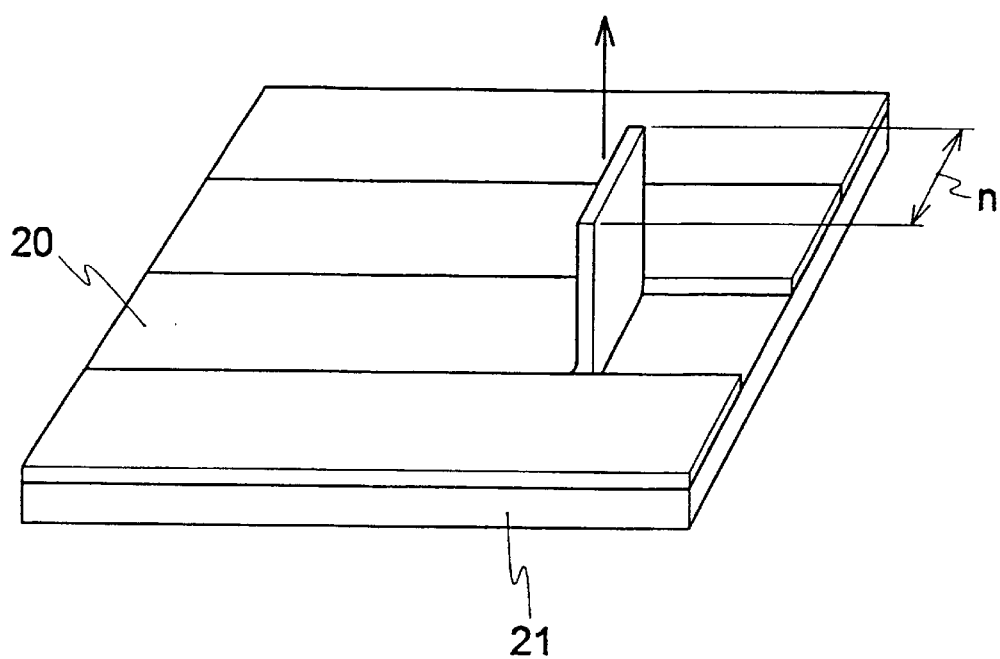
FIG. 17 is a diagrammatic perspective view of a test sample for measuring adhesive strength in (2) of Example 19 of the present invention.

FIG. 16 is a diagrammatic perspective view of an aluminum plate having a coating film obtained in (1) of Example 19. As shown in FIG. 16, the coating film 20 obtained in (1) above was cut with a cutter at intervals of a width n (10 mm)

until the cutter reached the surface of the substrate, and one end of each cut strip of the coating film 20 was peeled. Thus a coated sample was obtained for measuring adhesive strength. FIG. 17 is a diagrammatic perspective view of the coated sample for measuring adhesive strength.

As shown in FIG. 17, the coating film 20 was pulled up at an angle of 90 degrees to the aluminum plate 21 and peeling strength was measured. The measurement was carried out at room temperature at a cross head speed of 50 mm/min by using TENSILON Universal Tester (the same one as in Example 7), and an average value of peel according to area method was assumed to be adhesive strength. The results are shown in Table 12.

(3) Measurement of Heat Resistance of Adhesion

A plate coated with a powder coating composition was produced separately in the same manner as in above (1), and put in a hot air dryer set at 300° C. After the lapse of 200 hours and 500 hours, the coated plate was taken out of the dryer. After the respective lapse of time, the coated plate was cooled to room temperature, and test sample was made and adhesive strength was measured in the same manner as in the above (2). The results are shown in Table 12.

Comparative Example 17

Heat Resistance of Adhesion of Plate Coated with Powder Coating Composition and having a Primer as an Adhesive Layer (1) Coating of Primer An aluminum plate pre-treated in the same manner as in Example 7 was coated with a heat resisting primer for a fluorine-containing resin coating composition (POLYFLON TFE Enamel EK1959DGN available from DAIKIN INDUSTRIES, LTD.) by spraying so that the coating thickness would become about 10 μm, followed by sintering at 100° C. for 10 minutes.

(2) Production of Plate Coated with Powder Coating Composition

On the primer-coated plate of above (1) was applied only a PFA powder coating composition having no functional group (the same one as in Example 19) by electrostatic coating in the same manner as in (1) of Example 19, followed by sintering at 380° C. for 20 minutes to give a coating thickness of 126 μm including the primer layer.

(3) Measurement of Adhesive Strength

The same procedures as in (2) of Example 19 were repeated. The results are shown in Table 12.

(4) Measurement of Heat Resistance of Adhesion

The same procedures as in (3) of Example 19 were repeated. The results are shown in Table 12.

Examples 20 and 21

Heat Resistance of Adhesion of Plate Coated with PFA Powder Coating Composition having Hydroxyl Plates coated with a powder coating composition were made and adhesive strength and heat resistance of adhesion were measured in the same manner as in Example 19 except that instead of the aluminum plate, a SUS430 steel plate pre-treated like the aluminum plate (Example 20) and a galvanized steel plate subjected to only degreasing (Example 21) were used. The results are shown in Table 12.

Comparative Examples 18 and 19

Heat Resistance of Adhesion of Plate Coated with Powder Coating Composition and having a Primer as an Adhesive Layer Plates coated with a powder coating composition were made and adhesive strength and heat resistance of adhesion were measured in the same manner as in Comparative Example 17 except that instead of the aluminum plate, a SUS430 steel plate pre-treated like the aluminum plate (Comparative Example 18) and a galvanized steel plate subjected to only degreasing (Comparative Example 19) were used. The results are shown in Table 12.

TABLE 12

|  | Ex. 19 | Ex. 20 | Ex. 21 | Com. Ex. 17 | Com. Ex. 18 | Com. Ex. 19 |
|---|---|---|---|---|---|---|
| Laminated article |  |  |  |  |  |  |
| Appearance | Transparent coating film | Transparent coating film | Transparent coating film | Brown | Brown | Brown |
| Substrate | Aluminum | SUS430 | Galvanized steel plate | Aluminum | SUS430 | Galvanized steel plate |
| Surface layer | Film of PFA powder coating composition having no OH group 1) | Film of PFA powder coating composition having no OH group 1) | Film of PFA powder coating composition having no OH group 1) | Film of PFA powder coating composition having no OH group 1) | Film of PFA powder coating composition having no OH group 1) | Film of PFA powder coating composition having no OH group 1) |
| Adhesive layer | Film of PFA powder coating composition having OH group 2) | Film of PFA powder coating composition having OH group 2) | Film of PFA powder coating composition having OH group 2) | Primer for fluorine-coating resin coating 3) | Primer for fluorine-coating resin coating 3) | Primer for fluorine-coating resin coating 3) |
| Coating thickness (μm) | 140–180 | 110–140 | 150–170 | 120–140 | 100–120 | 170–200 |
| Initial adhesive strength (kgf/cm) | 1.7 | 1.6 | not less than 2.0 (breakage of coating film) | 2.0 | 2.0 | 0.9 |
| Heat resistance of adhesion |  |  |  |  |  |  |
| Adhesive strength at 300° C. after 200 hours (kgf/cm) | not less than 1.6 (breakage of coating film) | 1.2 | not less than 1.5 (breakage of coating film) | 0.95 | 0.1 | 0.7 |

TABLE 12-continued

|  | Ex. 19 | Ex. 20 | Ex. 21 | Com. Ex. 17 | Com. Ex. 18 | Com. Ex. 19 |
| --- | --- | --- | --- | --- | --- | --- |
| Adhesive strength at 300° C. after 500 hours (kgf/cm) | not less than 1.6 (breakage of coating film) | 1.1 | 1.0 | 0.2 | not more than 0.1 | 0.4 |

1) NEOFLON Powder Coating Composition ACX-31 available from DAIKIN INDUSTRIES, LTD.
2) Powder coating composition obtained in Reference Example 7
3) POLYFLON TFE Enamel EK1959DGN available from DAIKIN INDUSTRIES, LTD.

Example 22

Heat Resistance of Adhesion of Laminated Plate of PFA having Hydroxyl (1) Production of Laminated Plate An aluminum plate pre-treated in the same manner as in Example 7 was used as a substrate. A PFA film having hydroxyl and obtained in Preparation Example 13 (thickness 100 μm), a PFA film having no functional group (NEOFLON PFA Film AF-0100 available from DAIKIN INDUSTRIES, LTD.) (thickness 100 μm) and a polyimide film for separation (the same one as in Example 15) were cut to the same size as the substrate.

Figure 18:
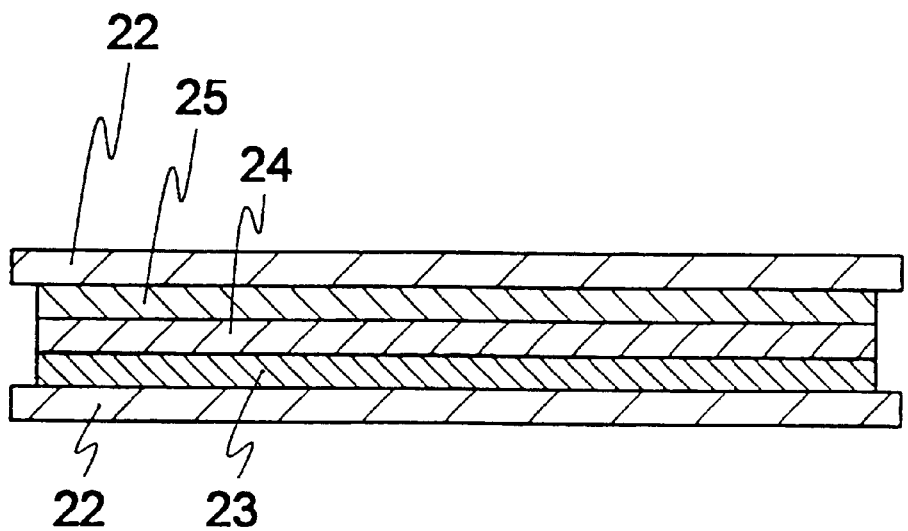
FIG. 18 is a diagrammatic cross-sectional view of a laminated test plate made in Example 22.
Figure 19:
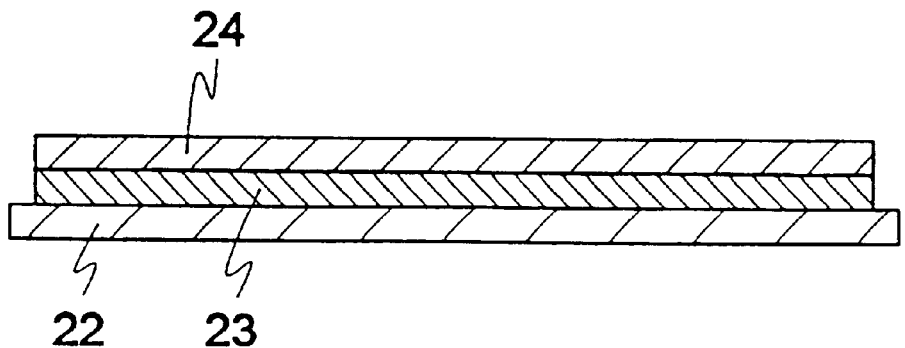
FIG. 19 is a diagrammatic cross-sectional view of a three-layered laminated article made in Example 22 of the present invention.

FIG. 18 is a diagrammatic cross-sectional view of a laminated test plate. As shown in FIG. 18, the above-mentioned hydroxyl-containing PFA film 23, PFA film 24 having no functional group and polyimide film 25 were inserted between the two aluminum plates 22 (one is a substrate), and set on a press machine preset at 350° C., followed by preheating (for 20 minutes) and then pressing at 50 kgf/cm² for one minute. After cooling, the polyimide film 25 and aluminum plate 22 contacting the polyimide film 25 were removed to give a three-layered laminated article comprising the hydroxyl-containing PFA film 23 as an adhesive layer, aluminum plate 22 and PFA film 24. FIG. 19 is a diagrammatic cross-sectional view of the obtained three-layered laminated article.

(2) Adhesive Strength

A test sample for measuring adhesive strength was produced by using the laminated plate (three-layered laminated article) obtained in above (1) instead of the plate coated with a powder coating composition and obtained in (1) of Example 19, and cutting at intervals of a width of 10 mm in the same manner as in (2) of Example 19 and peeling one end of each strip-like film from an interface between the aluminum plate and the hydroxyl-containing PFA film layer. The adhesive strength was measured by pulling up the peeled film at an angle of 90 degrees in the same manner as in (2) of Example 19. The results are shown in Table 13.

(3) Measurement of Heat Resistance of Adhesion

Another laminated plate of above (1) was produced separately, and measurement was made by using the produced laminated plate in the same manner as in (3) of Example 19. The results are shown in Table 13.

Examples 23 and 24

Heat Resistance of Adhesion of Hydroxyl-containing PFA Laminated Plate

Production of laminated plates and measurements of adhesive strength and heat resistance of adhesion were carried out in the same manner as in Example 22 except that instead of the aluminum plate, a SUS430 steel plate surface-treated like the aluminum plate (Example 23) and a galvanized steel plate subjected to only degreasing (Example 24) were used. The results are shown in Table 13.

Comparative Example 20

Heat Resistance of Adhesion of Laminated Plate Produced by Using Surface-treated Fluorine-containing Resin Film (1) Surface-treating of Fluorine-containing Resin Film One surface of a PFA film having no functional group (NEOFLON PFA Film AF-0100 available from DAIKIN INDUSTRIES, LTD.) (thickness 100 μm) was surface-treated with TETRAETCH A (available from Kabushiki Kaisha Jyunkosha) by the method mentioned below. One surface of the PFA film (adhering surface) was wiped with acetone, and after drying, the wiped surface was coated with a solution of TETRAETCH A. After the TETRAETCH A solution was allowed to stand on the film for about 20 seconds, the film was washed with methanol and pure water and then dried. The treated surface turned brown. Further according to testing method of wettability of film described in JIS K-6768, wettability of the treated surface was determined by using a standard test solution of 40 dyn/cm. It was recognized that the surface was uniformly wet and had been treated sufficiently. Water contact angle of the treated surface was 61 degrees (110 degrees before treatment).

(2) Production of Laminated Plate

Two-liquid mixing type heat resisting epoxy adhesive (HITEMP HT-100L available from Kabushiki Kaisha Konishi) was coated on an aluminum plate pretreated in the same manner as in Example 7. The surface-treated PFA film of above (1) was cut to the same size as the substrate, and its treated surface was brought into close contact to the adhesive layer of the substrate. After heating at 120° C. for one hour, sintering was carried out at 180° C. for 20 hours for curing and adhering the film to the substrate.

(3) Measurement of Adhesive Strength

A test sample for measuring adhesive strength was produced in the same manner as in (2) of Example 22 by using the laminated plate obtained in above (2) instead of the laminated plate obtained in Example 22, and cutting at intervals of a width of 10 mm and peeling one end of each strip-like film from an interface between the PFA film and the adhesive layer. The adhesive strength was measured in the same manner as in (2) of Example 19 by pulling up the peeled film at an angle of 90 degrees to the substrate. The results are shown in Table 13.

(4) Measurement of Heat Resistance of Adhesion

Another laminated plate of above (2) was produced, and by using it, measurement was made in the same manner as in (3) of Example 19. The results are shown in Table 13.

Comparative Example 21 and 22

Heat Resistance of Adhesion of Laminated Article Produced by Using Surface-treated Fluorine-containing Resin Film Surface-treating of a fluorine-containing resin film, production of laminated plates and measurements of adhesive strength and heat resistance of adhesion were carried out in the same manner as in Comparative Example 20 except that instead of the aluminum plate, a SUS430 steel plate surface-treated like the aluminum plate (Comparative Example 21) and a galvanized steel plate subjected to only degreasing (Comparative Example 22) were used. The results are shown in Table 13.

Comparative Example 23

Heat Resistance of Adhesion of Laminated Article Produced by Using Surface-treated Film (1) surface Treatment of Fluorine-containing Resin Film A surface-treated FEP film (NEOFLON FEP Film NF-0100B1 available from DAIKIN INDUSTRIES, LTD., one side is surface-treated) (thickness 100 μm) was used instead of the PFA film of (1) of Comparative Example 20 surface-treated with TETRAETCH.

(4) Measurement of Heat Resistance of Adhesion

Another laminated plate of above (2) was produced, and by using it, measurement was carried out in the same manner as in (3) of Example 19. The results are shown in Table 13.

Comparative Example 24 and 25

Heat Resistance of Adhesion of Laminated Plate Produced by Using Surface-treated Fluorine-containing Resin Film Production of laminated plates, and measurements of adhesive strength and heat resistance of adhesion were carried out in the same manner as in Comparative Example 23 except that instead of the aluminum plate, a SUS430 steel plate surface-treated like the aluminum plate (Comparative Example 24) and a galvanized steel plate subjected to only degreasing (Comparative Example 25) were used. The results are shown in Table 13.

TABLE 13

| | Ex. 22 | Ex. 23 | Ex. 24 | Com. Ex. 20 | Com. Ex. 21 | Com. Ex. 22 | Com. Ex. 23 | Com. Ex. 24 | Com. Ex. 25 |
|---|---|---|---|---|---|---|---|---|---|
| Laminated article | | | | | | | | | |
| Appearance | Transparent coating film | Transparent coating film | Transparent coating film | Brown | Brown | Brown | Brown | Brown | Brown |
| Substrate | Aluminum | SUS430 | Galvanized steel plate | Aluminum | SUS430 | Galvanized steel plate | Aluminum | SUS430 | Galvanized steel plate |
| Surface layer | Film of PFA having no OH group 1) | Film of PFA having no OH group 1) | Film of PFA having no OH group 1) | PFA film surface-treated with TETRAETCH | PFA film surface-treated with TETRAETCH | PFA film surface-treated with TETRAETCH | Surface-treated FEP film 4) | Surface-treated FEP film 4) | Surface-treated FEP film 4) |
| Adhesive layer | PFA film having OH group 2) | PFA film having OH group 2) | PFA film having OH group 2) | Heat resisting epoxy adhesive 3) | Heat resisting epoxy adhesive 3) | Heat resisting epoxy adhesive 3) | Heat resistive epoxy adhesive 3) | Heat resistive epoxy adhesive 3) | Heat resistive epoxy adhesive 3) |
| Coating thickness (μm) | 180–220 | 170–200 | 200–230 | 150–190 | 160–190 | 170–190 | 130–160 | 160–180 | 160–180 |
| Initial adhesive strength (kgf/cm) | 2.1 | 2.5 | 2.2 | 1.6 | 1.0 | 1.6 | 1.5 | 1.5 | 1.5 |
| Heat resistance of adhesion | | | | | | | | | |
| Adhesive strength at 300° C. after 200 hours (kgf/cm) | not less than 2.0 (breakage of film) | 2.2 | not less than 2.0 (breakage of film) | Spontaneous peeling (peeling at substrate side) | Spontaneous peeling (peeling at substrate side) | Spontaneous peeling (peeling at substrate side) | Spontaneous peeling (peeling at substrate side) | Spontaneous peeling (peeling at substrate side) | Spontaneous peeling (peeling at substrate side) |
| Adhesive strength at 300° C. after 500 hours (kgf/cm) | not less than 2.0 (breakage of film) | 2.2 | not less than 2.0 (breakage of film) | Spontaneous peeling (peeling at substrate side) | Spontaneous peeling (peeling at substrate side) | Spontaneous peeling (peeling at substrate side) | Spontaneous peeling (peeling at substrate side) | Spontaneous peeling (peeling at substrate side) | Spontaneous peeling (peeling at substrate side) |

1) NEOFLON PFA Film AF-0100 available from DAIKIN INDUSTRIES, LTD.
2) Film obtained in Preparation Example 13
3) HITEMP HT-100L available from Kabushiki Kaisha Konishi
4) NEOFLON FEP Film NF-0100B1 available from DAIKIN INDUSTRIES, LTD.

(2) Production of Laminated Plate

An epoxy adhesive was coated on a pre-treated aluminum plate and a surface-treated film was laminated on the coated aluminum plate in the same manner as in (2) of Comparative Example 20 except that the surface-treated FEP film of above (1) was used instead of the PFA film surface-treated with TETRAETCH.

(3) Measurement of Adhesive Strength

Production of a test sample and measurement of adhesive strength were carried out in the same manner as in Comparative Example 20 except that the laminated plate obtained in above (2) was used instead of the laminated plate which was produced by using a PFA film treated with TETRAETCH in (2) of Comparative Example 20.

According to the present invention, it is possible to obtain a composite material for cooking apparatuses which is produced by applying, to a substrate, a material comprising a fluorine-containing polymer having excellent adhesive property, without necessitating complicated steps. Further according to the present invention, it is possible to obtain a composite material for cooking apparatuses which is excellent in heat resistance, non-sticking property, stain-proofing property, water- and oil-repelling property, stain removing property, chemical resistance, rust-preventive property, antibacterial property, resistance to energy ray and friction property.

What is claimed is:

1. A method for endowing a cooking apparatus with heat resistance of adhesion which comprises applying, between a substrate and a surface layer, a material comprising a fluorine-containing ethylenic polymer having functional group and prepared by copolymerizing;

(a) 0.05 to 30% by mole of at least one of fluorine-containing ethylenic monomers having at least one functional group selected from the group consisting of hydroxyl, carboxyl, a carboxylic salt group, a carboxylic ester group and epoxy, and (b) 70 to 99.95% by mole or at least one of fluorine-containing ethylenic monomers having no functional group mentioned above;

said surface layer comprising a layer of a fluorine-containing ethylenic polymer having no functional group.

* * * * *